(12) United States Patent
Stark

(10) Patent No.: US 9,563,906 B2
(45) Date of Patent: Feb. 7, 2017

(54) SYSTEM AND METHOD FOR VIRTUAL SHOPPING DISPLAY

(75) Inventor: Dean Stark, Toronto (CA)

(73) Assignee: 4D Retail Technology Corp., Toronto (CA)

( * ) Notice: Subject to any disclaimer, the term of this patent is extended or adjusted under 35 U.S.C. 154(b) by 55 days.

(21) Appl. No.: 13/372,428

(22) Filed: Feb. 13, 2012

(65) Prior Publication Data

US 2012/0206449 A1 Aug. 16, 2012

Related U.S. Application Data

(60) Provisional application No. 61/442,155, filed on Feb. 11, 2011.

(51) Int. Cl.
*G06Q 30/02* (2012.01)

(52) U.S. Cl.
CPC .................. *G06Q 30/0281* (2013.01)

(58) Field of Classification Search
CPC ............ G06Q 30/0641; G06Q 30/0643; G06Q 30/0281; G06Q 30/0601
USPC ... 345/420, 633; 703/1; 715/964; 359/15–35
See application file for complete search history.

(56) References Cited

U.S. PATENT DOCUMENTS

| | | | |
|---|---|---|---|
| 6,183,089 B1 | 2/2001 | Tehrani | 353/7 |
| 6,757,362 B1 | 6/2004 | Cooper et al. | |
| 7,020,845 B1 | 3/2006 | Gottfurcht et al. | |
| 7,778,942 B2 | 8/2010 | Naito | |
| 7,805,338 B2 | 9/2010 | Kolls | |
| 8,228,196 B1 | 7/2012 | Thornton | |
| 2002/0029205 A1 | 3/2002 | Pedraza et al. | 706/21 |
| 2002/0072974 A1* | 6/2002 | Pugliese et al. | 705/14 |
| 2002/0120554 A1* | 8/2002 | Vega | 705/37 |
| 2002/0165764 A1 | 11/2002 | Wade et al. | |
| 2002/0171637 A1 | 11/2002 | Kadowaki et al. | 345/204 |
| 2003/0119447 A1 | 6/2003 | Fisher et al. | |
| 2004/0047013 A1* | 3/2004 | Cai et al. | 359/15 |
| 2004/0068743 A1 | 4/2004 | Parry et al. | |

(Continued)

FOREIGN PATENT DOCUMENTS

| | | |
|---|---|---|
| CA | 2794542 | 8/2011 |
| CA | 2794489 | 9/2011 |

(Continued)

OTHER PUBLICATIONS

International Search Report dated Aug. 24, 2011.
(Continued)

*Primary Examiner* — Kee M Tung
*Assistant Examiner* — Whitney Pointe

(57) ABSTRACT

A system and method for a display device is provided. An image display that displays at least one image of at least one of a product and person is coupled to a support structure, and at least one shelf may be operatively coupled to the support structure. Further, at least one database stores a plurality of queries and replies to the queries, and at least one processor is provided that is operatively coupled to the database. The processor(s) programmed and configured to receive from the database at least one reply to a first query. The processor is further configured to transmit at least one instruction to the display for rendering a plurality of images of the person, wherein the rendered images of the person include providing the at least one reply to the first query.

19 Claims, 22 Drawing Sheets

(56) References Cited

U.S. PATENT DOCUMENTS

| | | |
|---|---|---|
| 2004/0075735 A1 | 4/2004 | Marmaropoulos |
| 2005/0055298 A1 | 3/2005 | Czora .................. 705/35 |
| 2005/0251800 A1 | 11/2005 | Kurlander et al. |
| 2006/0074831 A1 | 4/2006 | Hyder et al. .................. 706/45 |
| 2006/0149570 A1 | 7/2006 | McDaniel et al. .......... 705/26.1 |
| 2006/0229930 A9 | 10/2006 | Gottfurcht |
| 2006/0259942 A1 | 11/2006 | Toyama et al. |
| 2007/0203807 A1 | 8/2007 | DeAngelis |
| 2008/0010169 A1 | 1/2008 | Dollens .................. 705/27.2 |
| 2008/0022328 A1 | 1/2008 | Miller |
| 2008/0049020 A1 | 2/2008 | Gusler et al. |
| 2008/0086370 A1 | 4/2008 | Narayanaswami et al. |
| 2008/0256008 A1 | 10/2008 | Kwok .................. 706/20 |
| 2008/0282286 A1 | 11/2008 | Or |
| 2009/0046140 A1 | 2/2009 | Lashmet et al. |
| 2009/0276292 A1 | 11/2009 | Inselberg |
| 2009/0322678 A1 | 12/2009 | Lashina et al. |
| 2010/0017295 A1 | 1/2010 | Gottfurcht et al. |
| 2010/0063862 A1 | 3/2010 | Thompson et al. ......... 705/7.29 |
| 2010/0106607 A1 | 4/2010 | Riddiford et al. |
| 2010/0238188 A1 | 9/2010 | Miceli |
| 2010/0241999 A1 | 9/2010 | Russ et al. |
| 2010/0328306 A1 | 12/2010 | Chau et al. |
| 2011/0040539 A1* | 2/2011 | Szymczyk et al. ............. 703/6 |
| 2011/0137727 A1 | 6/2011 | Chung et al. |
| 2011/0191681 A1 | 8/2011 | Stark .................. 715/716 |
| 2011/0238535 A1 | 9/2011 | Stark .................. 705/27.1 |
| 2011/0248987 A1 | 10/2011 | Mitchell |
| 2012/0029691 A1* | 2/2012 | Mockus et al. ............... 700/232 |
| 2012/0206449 A1 | 8/2012 | Stark .................. 345/419 |

FOREIGN PATENT DOCUMENTS

| | | |
|---|---|---|
| CN | 102844738 | 12/2012 |
| EP | 1837830 | 9/2007 |
| EP | 2074911 | 7/2009 |
| EP | 2531912 | 12/2012 |
| EP | 2553647 | 2/2013 |
| JP | 2000/298544 | 10/2000 |
| JP | 2003-104554 | 4/2003 |
| JP | 2008-200256 | 9/2008 |
| KR | 10-0405988 | 11/2003 |
| WO | 2002/057896 | 7/2002 |
| WO | WO 02057896 A2 * | 7/2002 |
| WO | 2005003993 | 1/2005 |
| WO | 2006/047487 | 5/2006 |
| WO | 2006/115261 | 11/2006 |
| WO | 2009/032772 | 3/2009 |
| WO | 2011/120051 | 9/2011 |
| WO | 2011/127577 | 10/2011 |
| WO | 2011/127578 | 10/2011 |
| WO | WO 2011/127577 | 10/2011 |
| WO | 2011/097309 | 12/2011 |
| WO | 2012/106815 | 8/2012 |

OTHER PUBLICATIONS

International Search Report dated Aug. 15, 2011.
International Search Report dated Oct. 4, 2011.
International Search Report dated Oct. 31, 2011.
International Search Report dated May 24, 2012.
Online video of virtual presenter; http://www.youtube.com/watch?v=24U6iYYJFV0, uploaded Oct. 2, 2010, nuMedia Innovations, Inc.
J. L Hunt, B. G. Nickel, and Christian Gigault's paper "Anamorphic images" published in the American Journal of Physics, Mar. 2000, vol. 68, Issue 3, at pp. 232-237.
F. Leeman et al., "Hidden Images, Games of Perception Anamorphic Art Illusion", Harry N. Abrams, Inc., Publishers, New York, pp. 85-176 (1975).
Muller, N. J:, "Remote-control software aids help desk problem resolution", International Journal of Network Management, Sep. 1994, pp. 120-129.
USPTO, communication, dated Dec. 31, 2013, in related U.S. Appl. No. 13/073,894, filed Mar. 28, 2011.
USPTO, communication, dated May 21, 2013, in related U.S. Appl. No. 13/073,894, filed Mar. 28, 2011.
USPTO, communication, dated Oct. 1, 2014, in related U.S. Appl. No. 13/652,043, filed Oct. 15, 2012.

* cited by examiner

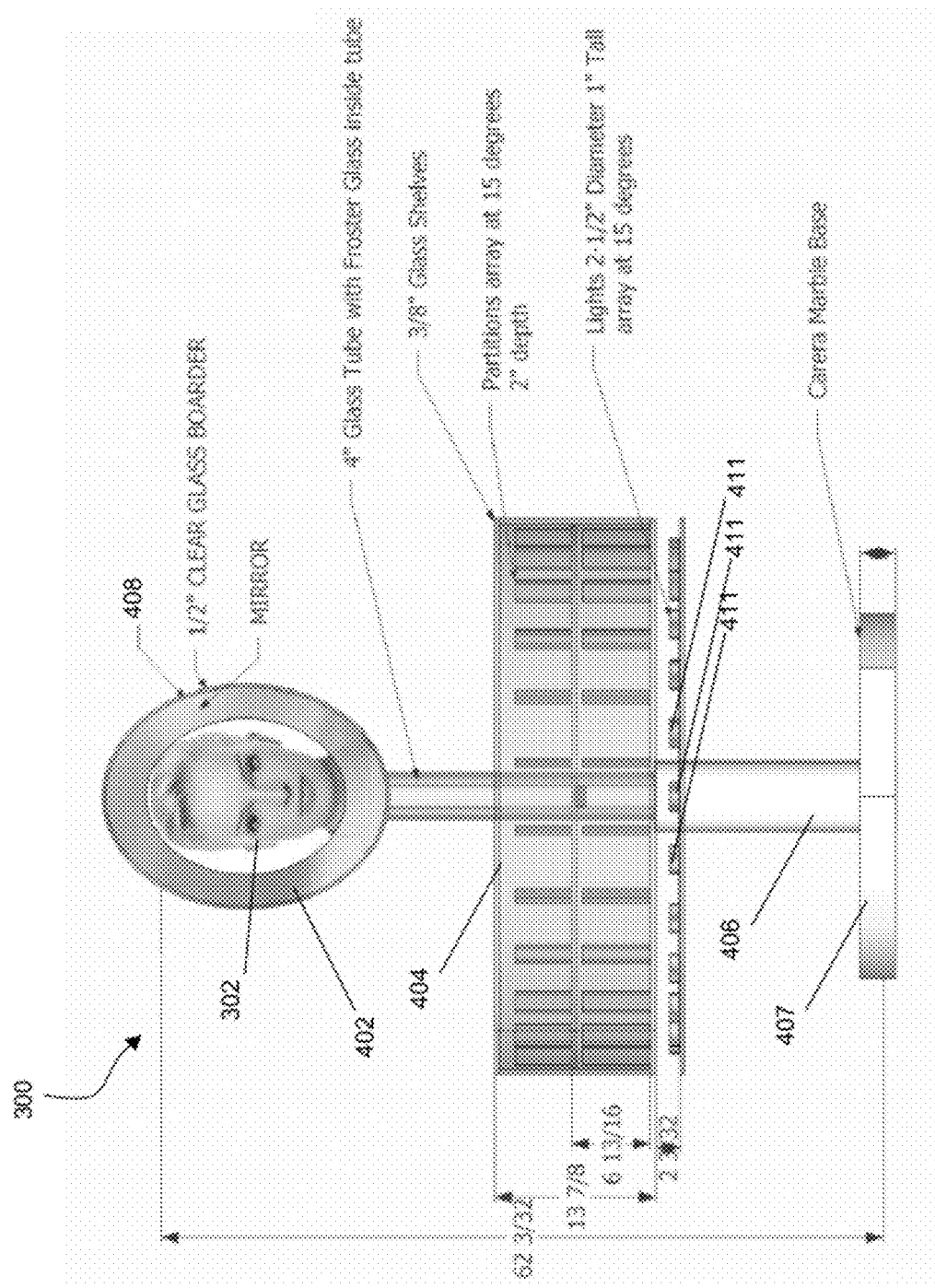

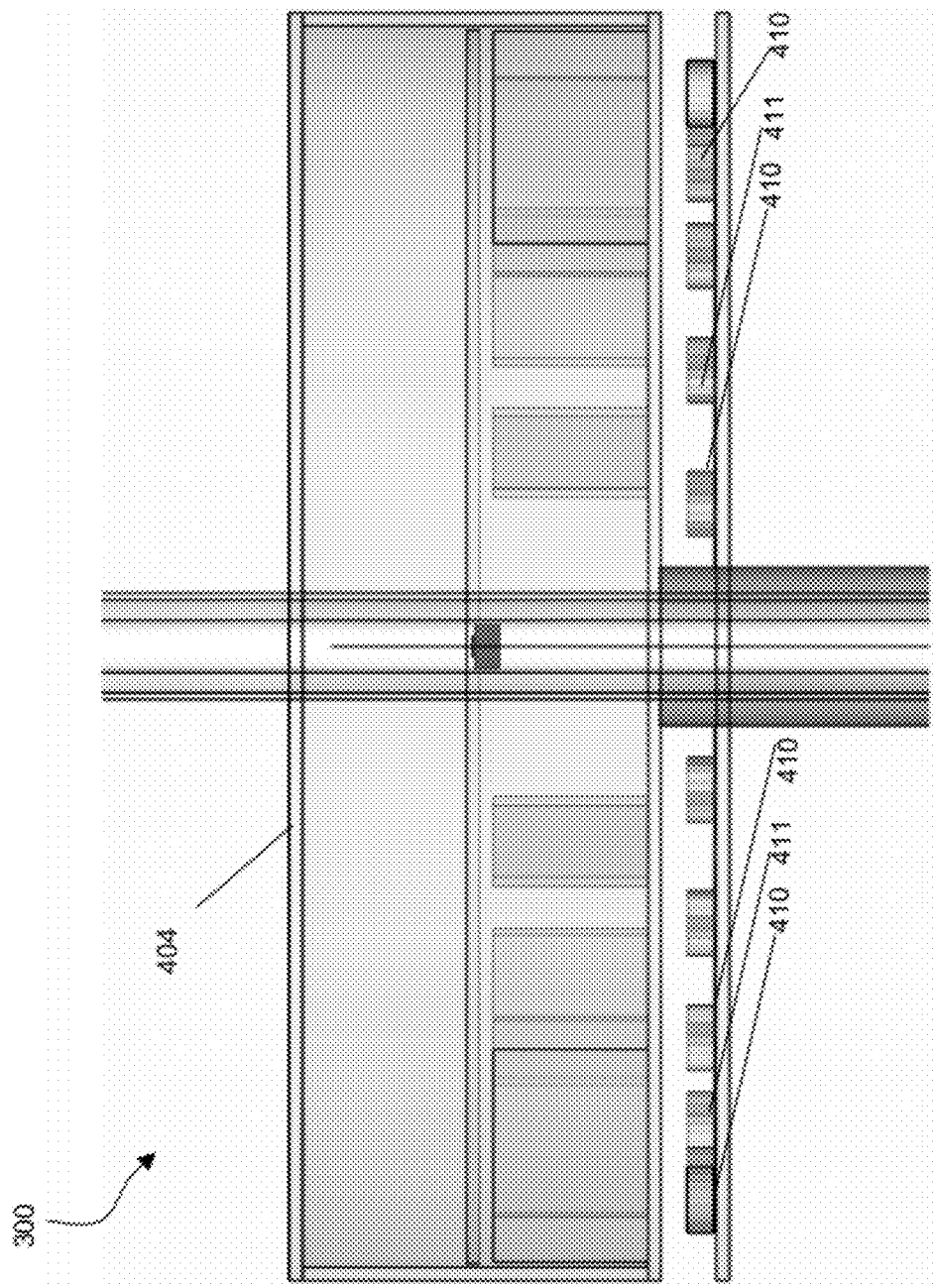

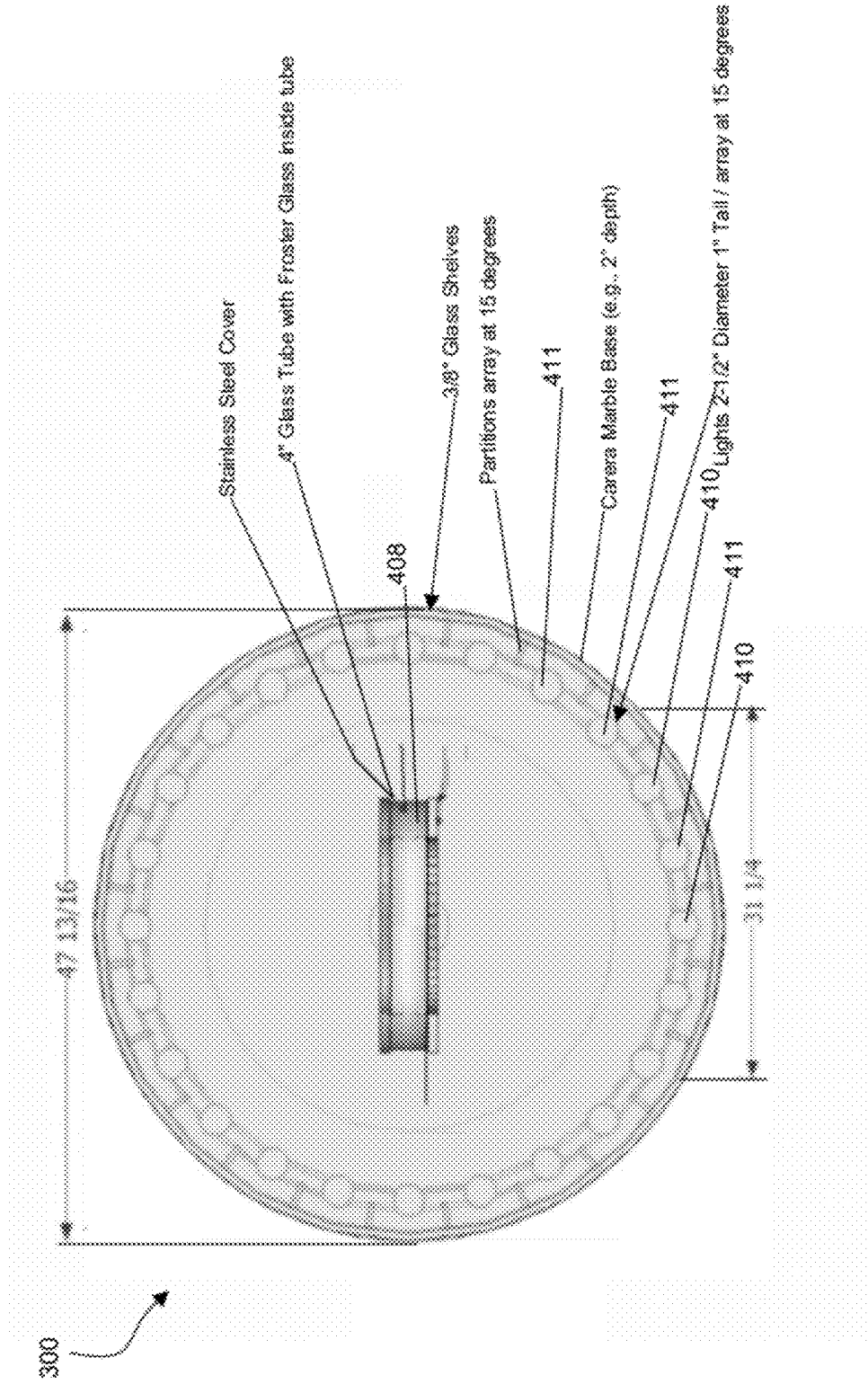

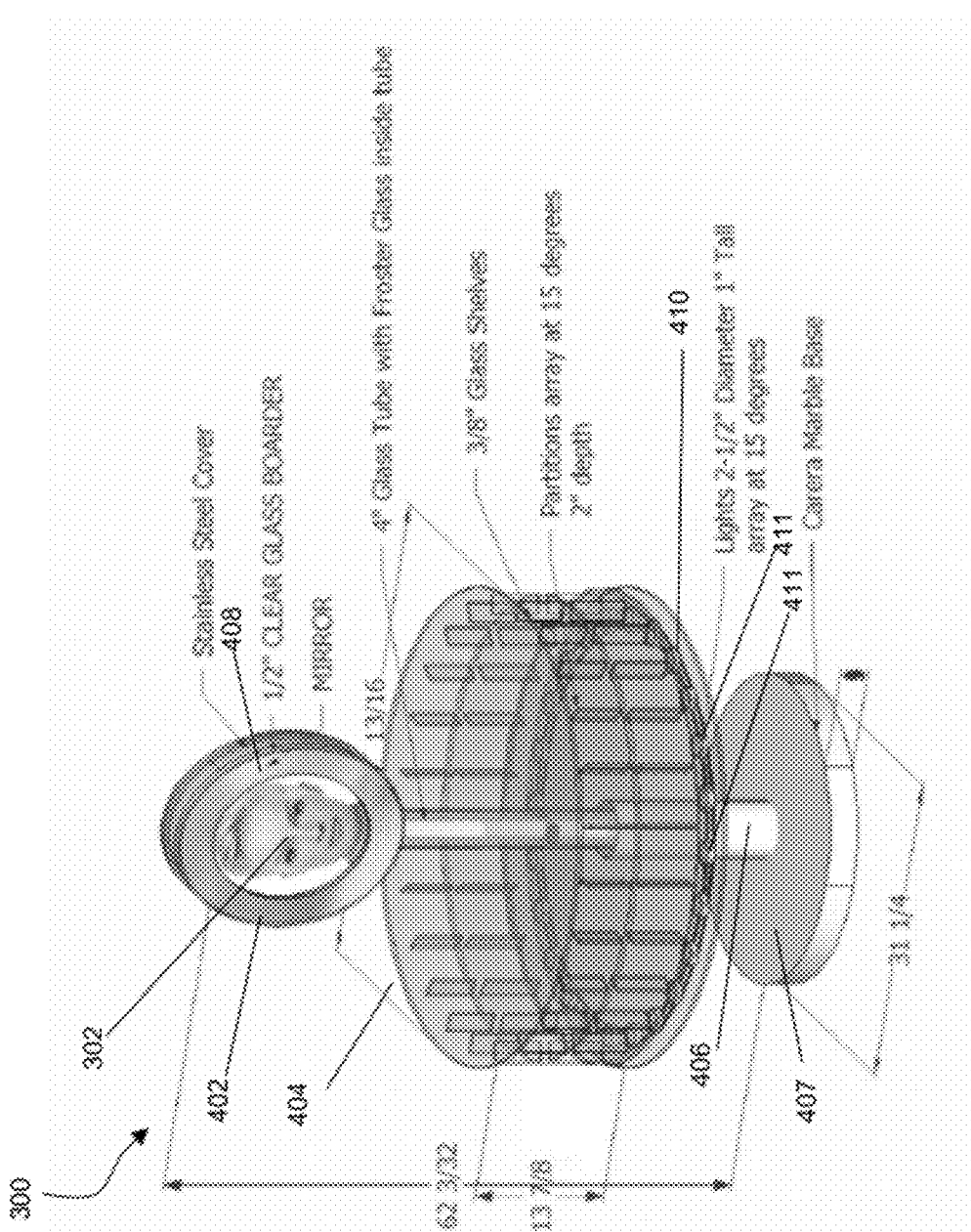

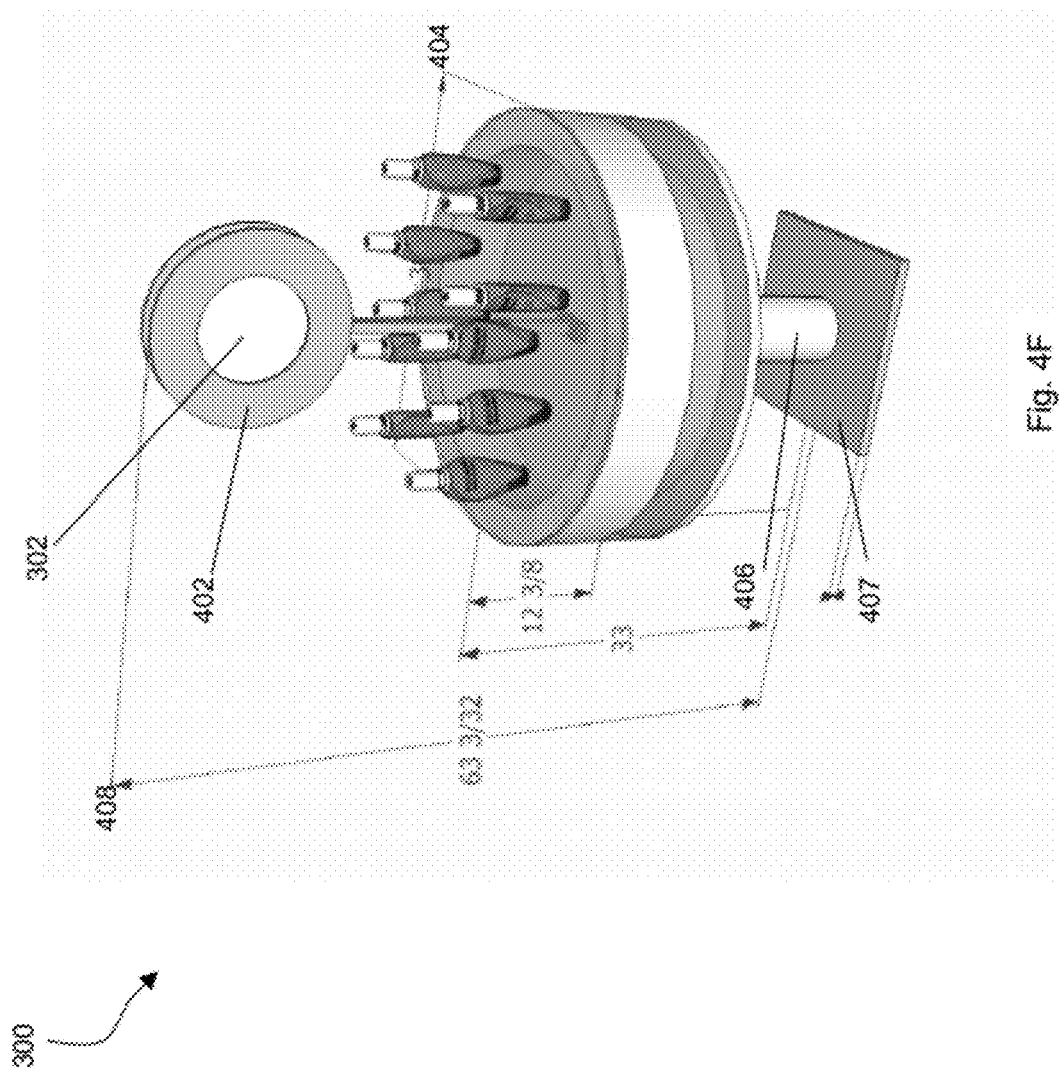

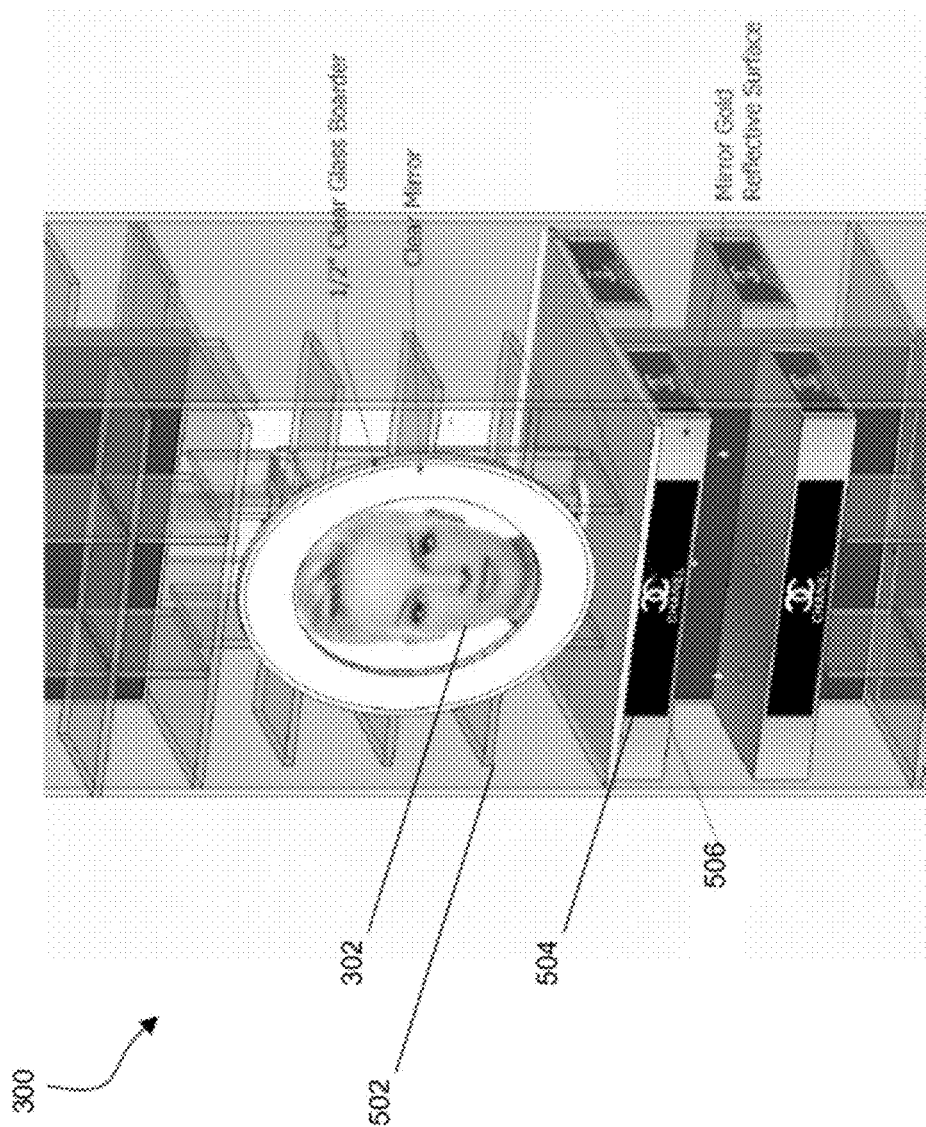

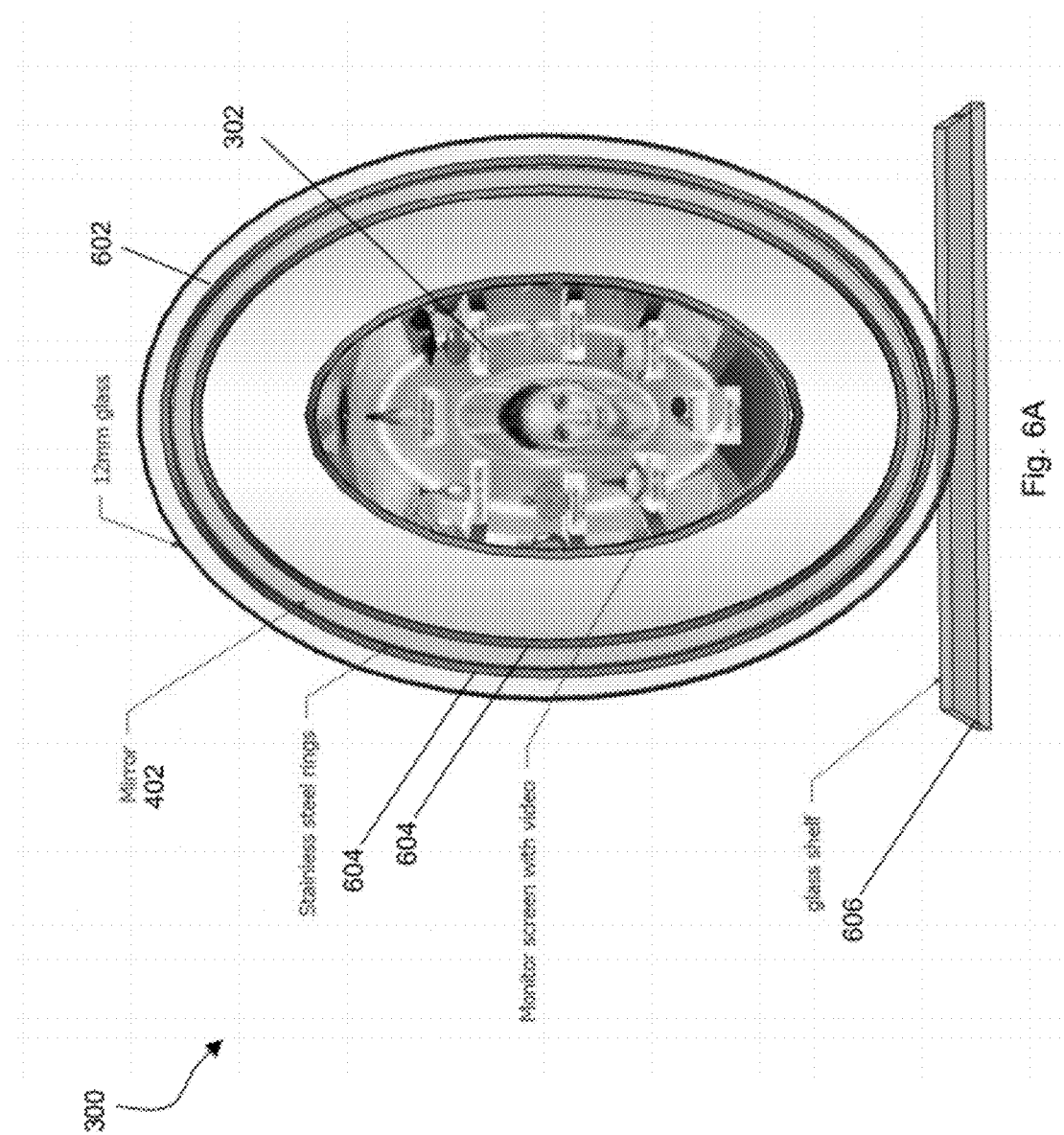

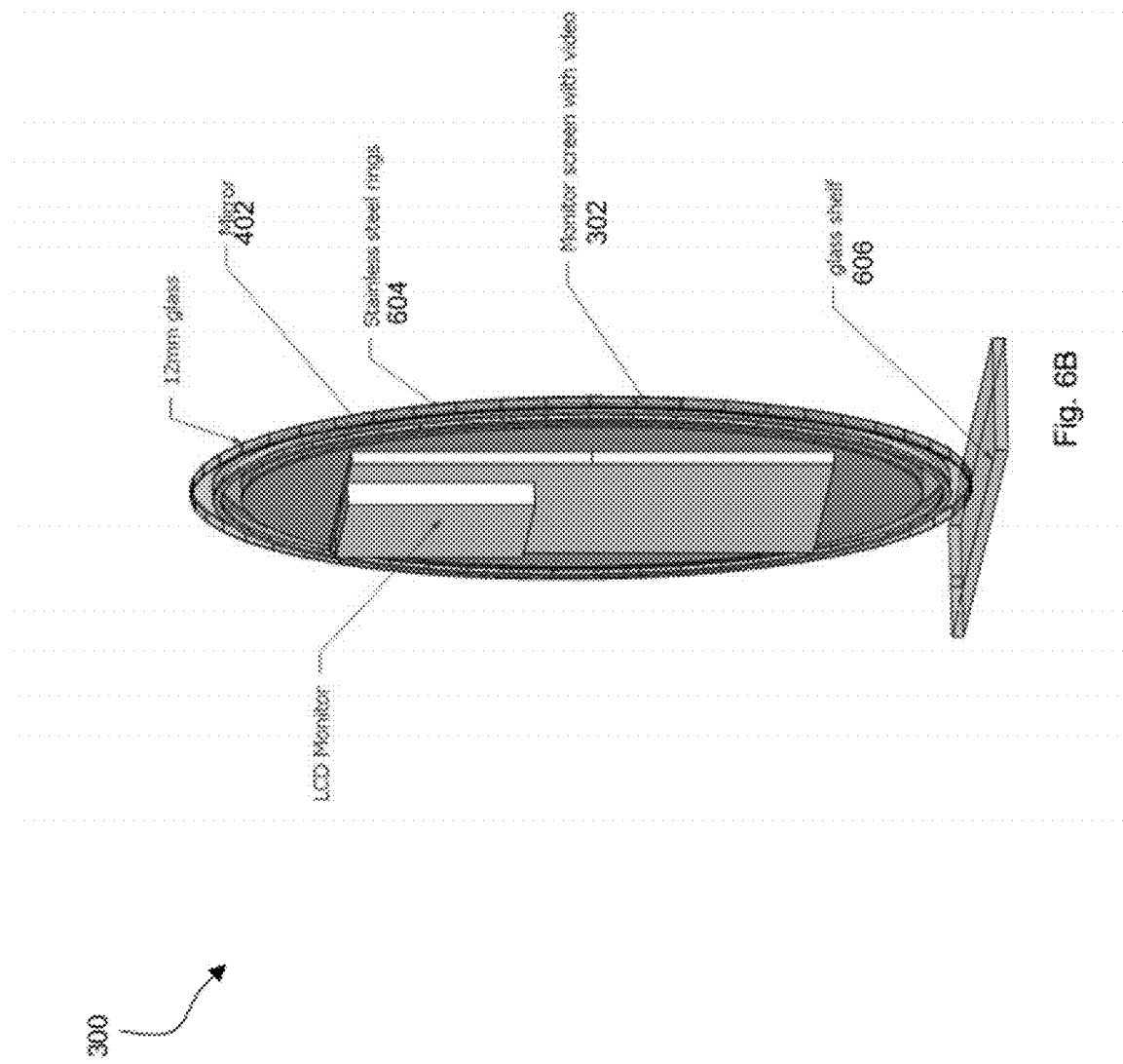

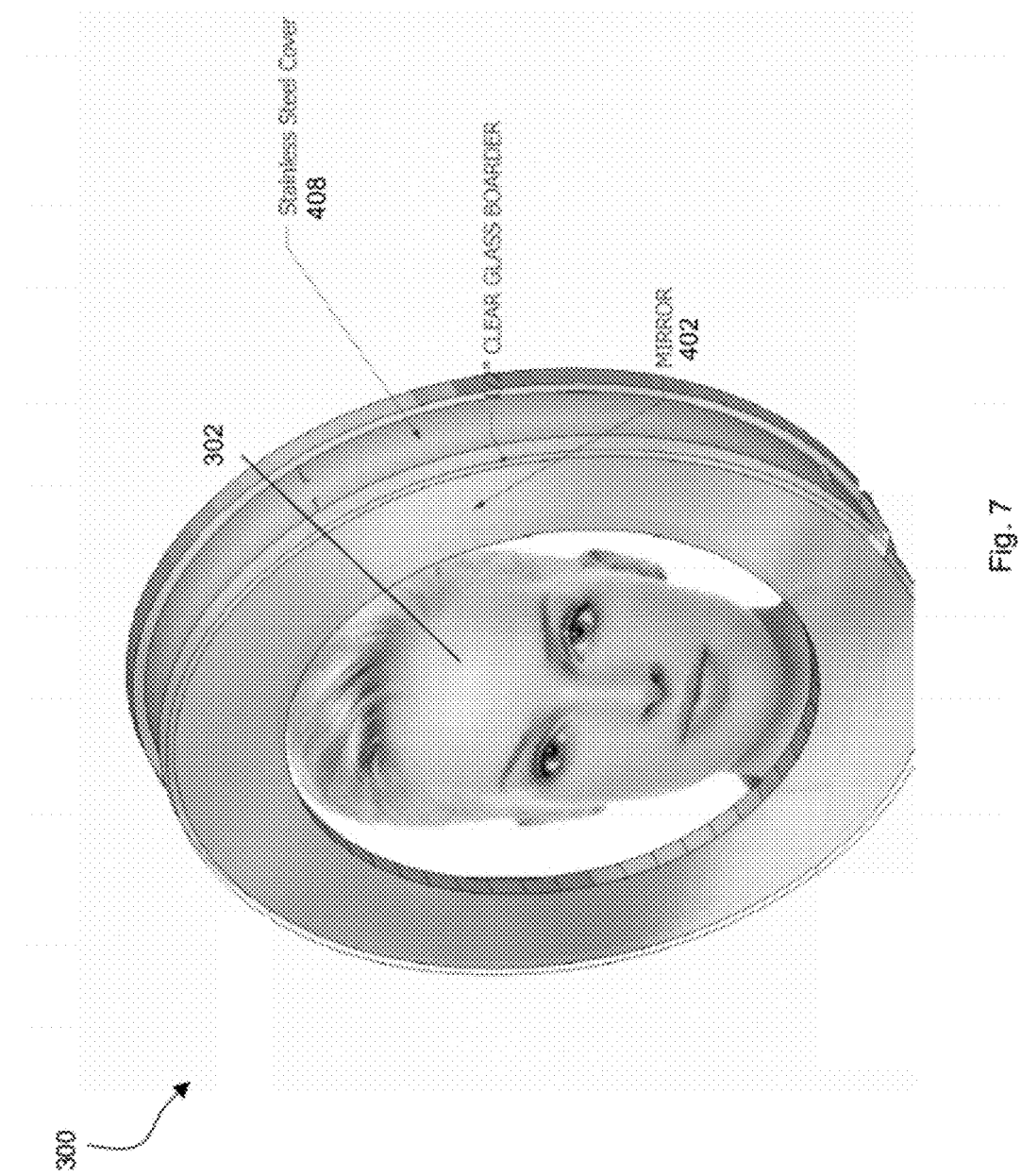

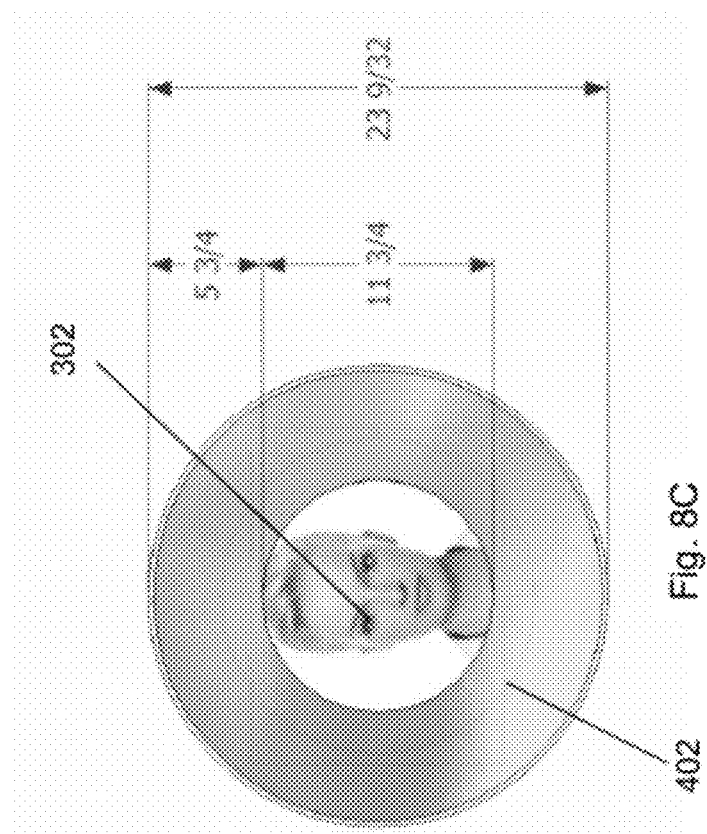

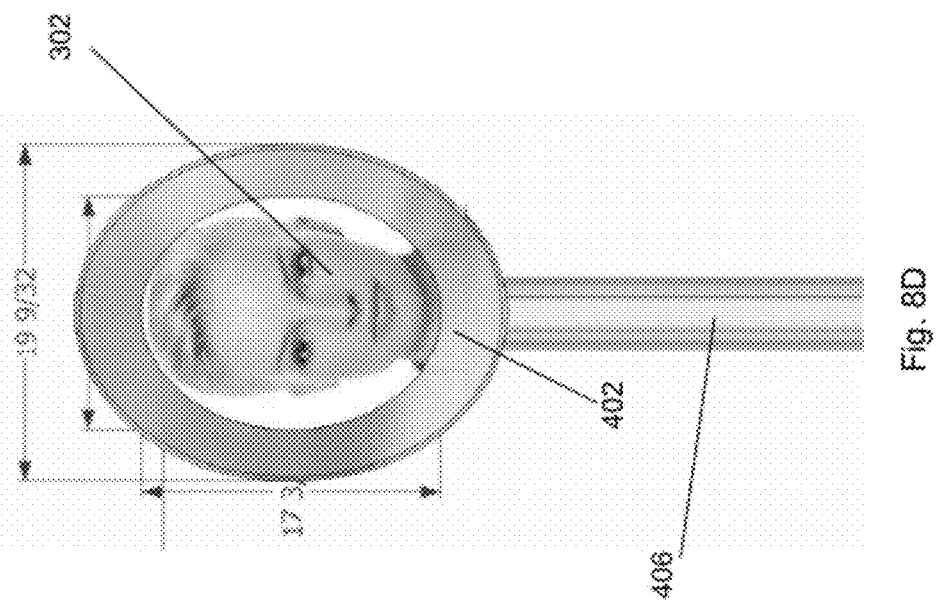

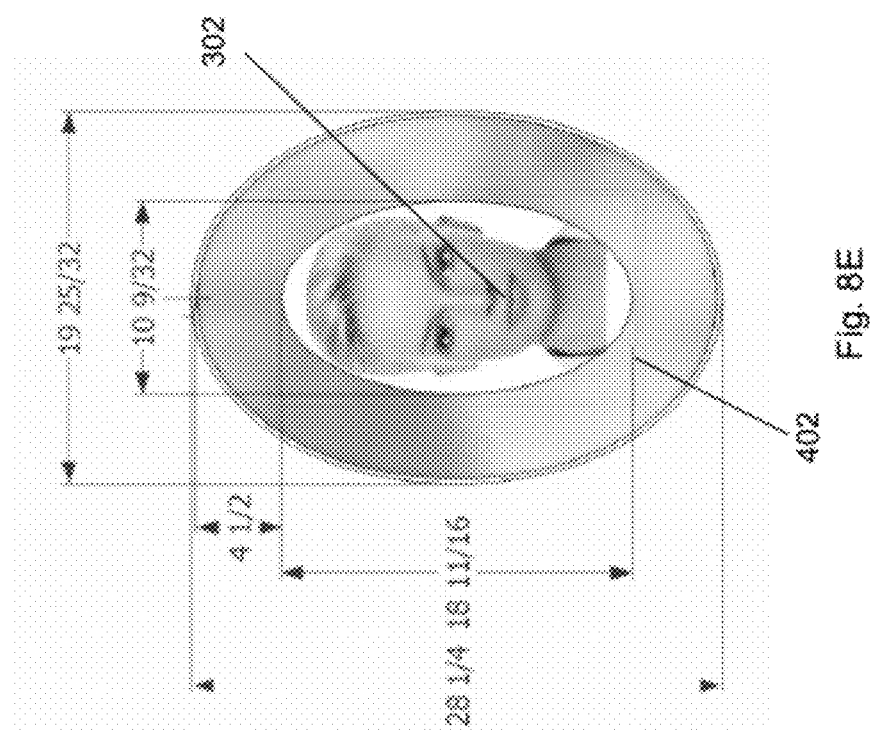

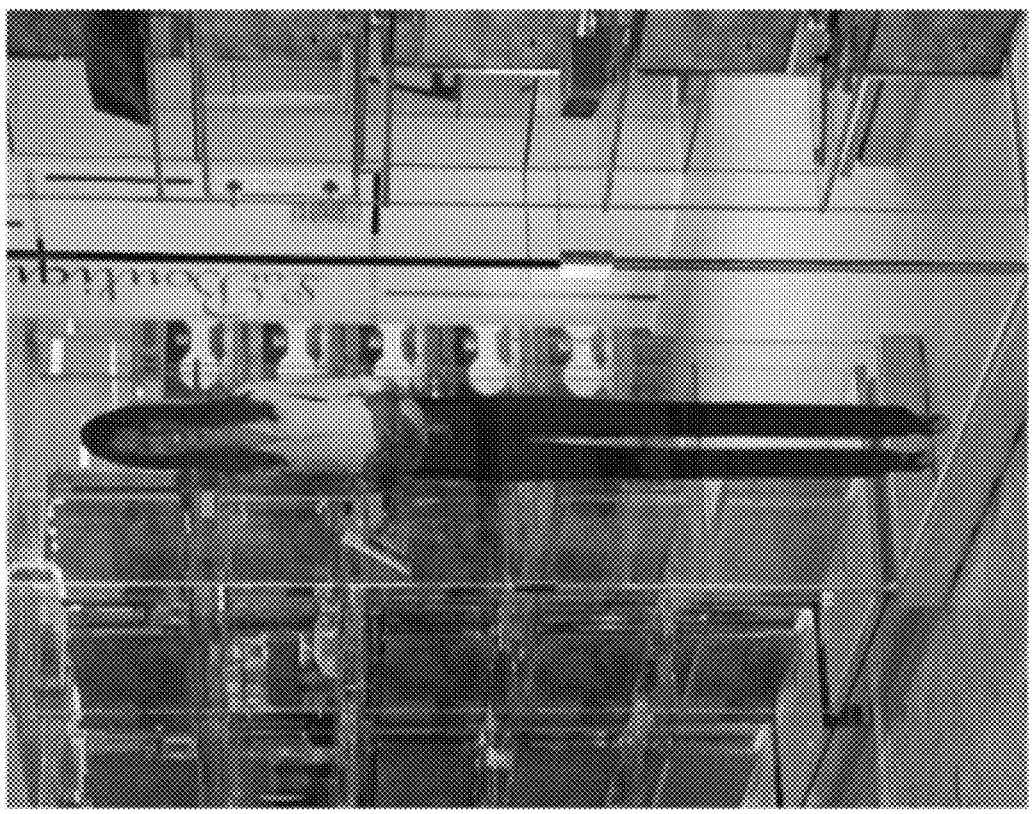
Fig. 10B

SYSTEM AND METHOD FOR VIRTUAL SHOPPING DISPLAY

RELATED APPLICATION

This application is based on and claims priority to U.S. Patent Application Ser. No. 61/442,155, filed on Feb. 11, 2011 and entitled "SYSTEMS AND METHODS FOR MAKING AND USING VIRTUAL SHOPPING DISPLAY FOR FACILITATING SHOPPING," the entire contents of which are hereby incorporated by reference.

BACKGROUND

Field

The present application relates, generally, to display systems and, more particularly, to a display device for information distribution and/or product sales.

Description of the Related Art

Shopping, particularly in large department stores, remains frustrating for many people. Information associated with one or more products, such as availability and use may be difficult to get, and shoppers often do not experience a product sufficiently before purchasing. The results are often product returns and frustration for the consumer.

SUMMARY

A system and method for a display device is provided. An image display that displays at least one image of at least one of a product and person is coupled to a support structure, and at least one shelf may be operatively coupled to the support structure. Further, at least one database stores a plurality of queries and replies to the queries, and at least one processor is provided that is operatively coupled to the database. The processor(s) programmed and configured to receive from the database at least one reply to a first query. The processor is further configured to transmit at least one instruction to the display for rendering a plurality of images of the person, wherein the rendered images of the person include providing the at least one reply to the first query.

Features and advantages of the present application will become apparent from the following description of the invention that refers to the accompanying drawings.

BRIEF DESCRIPTION OF THE DRAWINGS

For the purpose of illustrating the invention, there is shown in the drawings several forms which are presently preferred, it being understood, however, that the invention is not limited to the precise arrangements and instrumentalities shown. The features and advantages of the present invention will become apparent from the following description of the invention that refers to the accompanying drawings, in which:

FIGS. 4A-4F illustrate example embodiments of a virtual shopping display;

FIG. 5 illustrates an example virtual shopping display that includes a tower portion for at least product display;

FIGS. 6A and 6B illustrate an alternative embodiment of a virtual product display in accordance with the present application;

FIG. 7 illustrates a portion of an example embodiment of virtual shopping display in accordance with the present application;

FIGS. 8A-8E illustrate example embodiments of the present application and illustrate one or more mirrors provided in one or more different sizes and lengths;

FIG. 10B illustrates an example virtual human intelligence personal assistant, in connection with a virtual shopping display.

DESCRIPTION OF EMBODIMENTS

Figure 1:
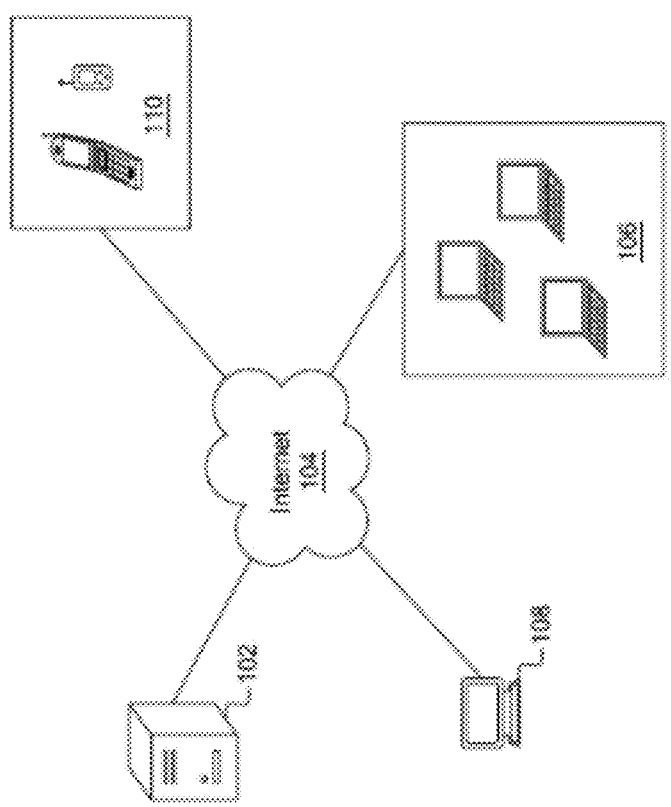
FIG. 1 illustrates an example hardware arrangement, in accordance with an embodiment of the present application.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In an embodiment, a virtual shopping display is provided with one or more display devices that enables users to view one or more images, such as a 2D/3D images, of a product or a series of products. The image(s) may appear as individual images and/or video. In one or more embodiments, audio and video content are provided. Moreover, a plurality of images may be overlaid to appear as a single, two or three-dimensional image. Alternatively or in addition, one or images may be of a person, avatar or other representation of someone. The image(s) may be used to advertise the particular product or series of products. Two or three-dimensional images are preferable for being highly realistic, such that the viewer will be convinced that a representation of a person, product or other form is actual and not virtual. In an embodiment, the image(s) are rendered using OpenGL or other suitable graphics code.

The image(s) displayed may be of at least a portion of a person (e.g., just a head that appears to be reflected in a mirror), and may include a recorded video of the head selling a particular product. Preferably, the image(s) are geared towards one or more specific products that are provided at or near the virtual product display. For example, the 2D/3D images may be of a young attractive female or male face in connection with a product that young people may desire. Alternatively, the image(s) may be of an elderly person, such as a grandmother in connection with cooking products, or may be a young girl or boy in connection with children's toys. Thus, the face that appears in the virtual product display is preferably provided in the context of a particular product that an individual has demonstrated some interest in. In effect, the context of a respective face depends at least in part on a product that is being offered for sale. The 2D/3D image(s) may also be talking or be non-talking or simply an animation, although it is believed by the inventor that speech accompanying video images adds to the level of realism and the likelihood that a product will sell.

In an embodiment, a plurality of different products (such as perfume-related products) may be arranged around a 2D/3D image display and be placed on lit-up platforms. The products may either be 2D/3D representations of products or they may actually be physical products themselves that the customers may interact with and touch. In either regard, the customer are preferably able to purchase the products provided around a 2D/3D image display.

In one or more embodiments, the respective "states" of shelves are monitored, substantially as described and shown in co-pending and co-owned PCT Patent Application PCT/CA2011/000412 (WO2011/127577), entitled INTERACTIVE VIDEO SHELVING SYSTEM and filed Apr. 13, 2010 (the entire contents of which are incorporated by reference herein). One or more respective shelves, or portions thereof, may be monitored by a content sensor that may be associated therewith. A 2D/3D image display screen and one or more content sensors may be interconnected with one or more computing devices and are operable to monitor the content of a shelf, cavity and/or compartment, and thereby the state thereof, and present one or more images in dependence on the state thereof.

In an embodiment, a mirror may be provided with virtual shopping display and may include an oval structure having a glass border and also a series of stainless steel rings making up the border. Although many of the examples and descriptions provided herein of the virtual shopping display relate to round or oval shaped displays, other geometric shapes are supported including, for example, rectangular, triangular, diamond or other shaped displays. The mirror may also be positioned on top of a glass shelf. Furthermore, the 2D/3D image provided on an 2D/3D image display may be broadcasted or provided on a monitor screen with video, or it may be some type of projection screen where video may be projected onto. In an embodiment, the hardware for having a LCD monitor broadcast the 2D/3D image may be available. Storage, such as for wires and a battery station for an LCD monitor, are positioned behind the LCD monitor. Although many of the examples and descriptions provided herein relate to liquid crystal display ("LCD") monitors, one skilled in the art will recognize that any suitable display type is supported including, for example, light emitting diode ("LED"), plasma, rear projection or other suitable display technology. Moreover, the present application supports any suitable interactive computing device including, for example, personal digital assistants, smartphones, tablet computers or the like.

In an embodiment, the projected or displayed images onto a virtual shopping display may be static or moving images, or a combination of both static and/or moving images. The projected or displayed video(s) and/or animations may be of any type that can be readily displayed or viewed on a standard display screen. The projected or displayed video content may be re-rendered before being displayed on a virtual shopping display.

In another embodiment, the projected or displayed content may be hyper-realistically rendered 2D/3D objects of tangible gift items so as to present the user with a very realistic 2D/3D shopping experience. The hyper-realistic 2D/3D objects are not mere photographs: they are actual rendered objects that can be rotated and viewed from all angles, as if the real gift item (e.g., teapot, dining set) were in front of the user. The hyper-realistic 2D/3D objects may be rendered in sophisticated graphics design software such as, for example, AUTODESK'S 2D/3DS MAX, 2D/3D STUDIO MAX, or any suitable advanced graphics design software used to render hyper-realistic 2D/3D objects. This content may be provided in a server off-site so that when loaded or displayed, there need not be excessive load times or the requirements to download excessively large plug-ins or other associated files for the rendered objects to display or the graphics design software to run.

The present application further supports dynamically rendered content as information is received from one or more sources. For example, a plurality of facial gestures, including lips, eyes, eyebrows or the like, as well as hand and arm gestures may be stored in a database and useable for rendering video content representing a person. As particular dialogue is received or otherwise obtained, a rendering of the person is made dynamically and substantially in real time to provide a realistic representation, such as a person speaking to a viewer.

A virtual shopping display in accordance with the present application may also provide optional touch interaction and sensor feedback using video touch technology or other technologies such as, for example, infrared, ultrasonic, active or inactive RFID (Radio Frequency Identification), barcode or the like. In an embodiment, a virtual shopping display in accordance with the present application may be oriented flat like the surface of a normal table, or may be attached to a wall or ceiling, propped up vertically up against a wall, or arranged diagonally, or propped up vertically on a glass structure, or placed within a larger glass tower, or in any direction where images and/or video may be projected upon it, and where users may view the projected content.

In another embodiment, the virtual shopping display in accordance with the present application may be able to transmit and receive relevant display information to and from a mobile cellular phone, PDA (e.g., Blackberry), smart phone (e.g., HTC device, iPhone) or other mobile computing device in order to display the image content upon the smaller screen of the applicable mobile device.

The image and/or video content that may be displayed on a virtual shopping display in accordance with one or more embodiments, (such as by projection or on the flat surface screen of virtual shopping display) may be provided in associated software. Furthermore, software may be utilized to manage the projection and/or display of the image and video content and the operation of various components used with virtual a shopping display, or on a virtual shopping display itself.

Referring now to the drawings, in which like reference numerals refer to like elements, FIG. 1 shows an example hardware arrangement associated with an embodiment of the present application. In the example shown in FIG. 1, server 102 is connected to at least one terminal through a network, wherein server 102 stores software according to an embodiment. Software or program code directed to functions and data structures which can be used in, for example, an interactive virtual marketing environment, and useful for engaging customers, and may be tied to remote server 102. Server 102 is preferably connected to connection network 104, which may be the Internet, which is in turn may be connected to at least one computer 108 by a direct connection, to at least one mobile computer 106 via a wireless connection or a direct connection, and to at least one cellular phone or mobile device 110, the cellular phones and mobile devices being configured to receive streaming video, internet-based content or Wireless Application Protocol (WAP) based content. The at least one cellular phone and mobile device 110 may include, for example, cell phones, smart phones, PDAs, blackberries, iPhones, or the like.

Figure 2:
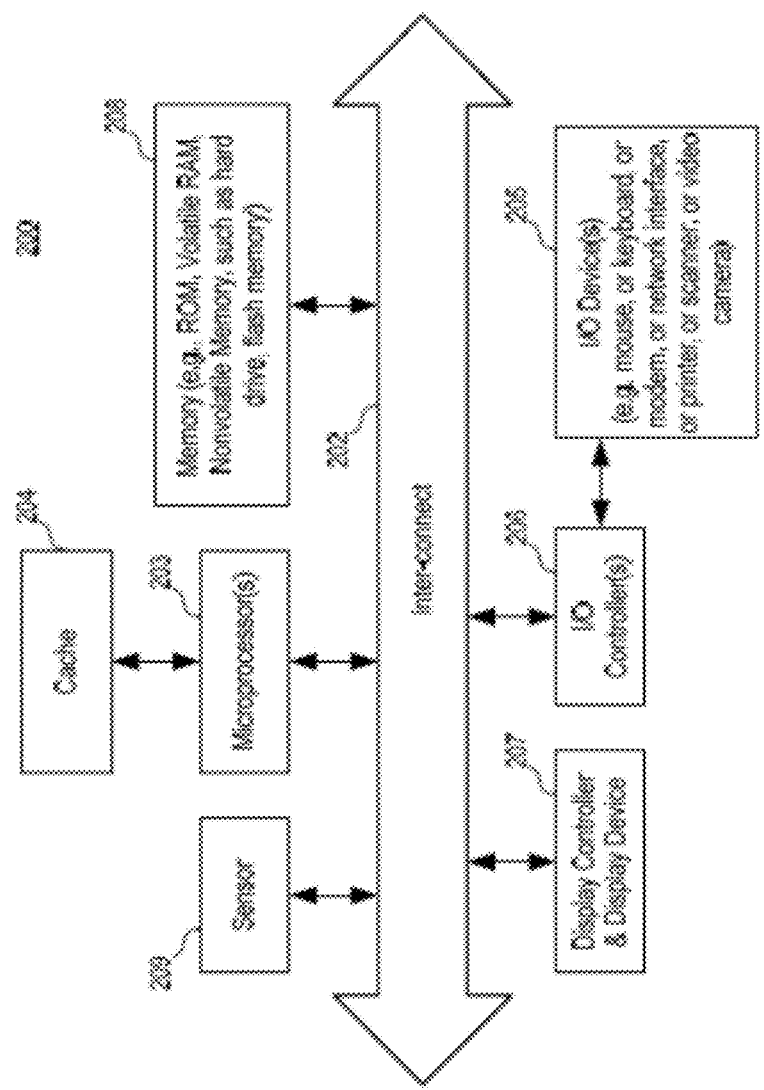
FIG. 2 illustrates functional elements, of which one or more may be configured in a computing device, in accordance with an embodiment.

FIG. 2 illustrates an example arrangement of components in a device in connection with the present application. The various components illustrated in FIG. 2 include those of a computer system, although it is not intended to represent any particular architecture or manner of interconnecting the components. Some embodiments may use other systems that have fewer or more components than those shown in FIG. 2. Data processing system 200 may include interconnect 202 (e.g., bus and system core logic), which interconnects a microprocessor(s) 203 and memory 208. Microprocessor 203 is coupled to cache memory 204. Inter-connect 202 interconnects the microprocessor(s) 203 and memory 208 together and also interconnects to a display controller, display device 207, sensor 209 and peripheral devices such as input/output (I/O) devices 205 through an input/output controller(s) 206. Sensor 209 may include, for example, an accelerometer to determine the orientation of the user terminal and/or to detect the shaking of the user terminal, or hand motions near the user terminal, or as another example, audio recording equipment to record sound near the user terminal.

Typical I/O devices include mice, keyboards, modems, network interfaces, printers, scanners, video cameras, touch pads, microphones and other devices which are well known in the art. In some embodiments, when the data processing system is a server system, some of the I/O devices, such as printer, scanner, mice, and/or keyboards, are optional. Interconnect 202 may include one or more buses connected to one another through various bridges, controllers and/or adapters. In an embodiment I/O controller 206 includes a USB (Universal Serial Bus) adapter for controlling USB peripherals, and/or an IEEE 1394 bus adapter for controlling IEEE-1394 peripherals. Memory 208 may include ROM (Read Only Memory), volatile RAM (Random Access Memory), and non-volatile memory, such as hard drive, flash memory, or the like.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects. In general, a machine readable medium includes any mechanism that provides (i.e., stores and/or transmits) information in a form accessible by a machine (e.g., a computer, network device, personal digital assistant, manufacturing tool, a device with a set of one or more processors, or the like).

A machine readable medium also can be used to store software and data which when executed by a data processing system causes the system to perform various methods. The executable software and data may be stored in various places including for example ROM, volatile RAM, non-volatile memory and/or cache. Portions of this software and/or data may be stored in anyone of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Portions of the data and instructions can also be obtained dynamically, just in time, when needed for execution. Thus, it is not required that the data and instructions be on a machine readable medium in entirety at a particular instance of time.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory. The non-volatile memory can be a local device coupled directly to the rest of the components in the data processing system. A non-volatile memory that is remote from the system, such as a network storage device coupled to the data processing system through a network interface such as a modem or Ethernet interface, can also be used.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), among others.

The computer-readable media may store the instructions. In general, a tangible machine readable medium includes any mechanism that provides (i.e., stores and/or transmits) information in a form accessible by a machine (e.g., a computer, network device, personal digital assistant, manufacturing tool, or any device with a set of one or more processors).

Figure 3:
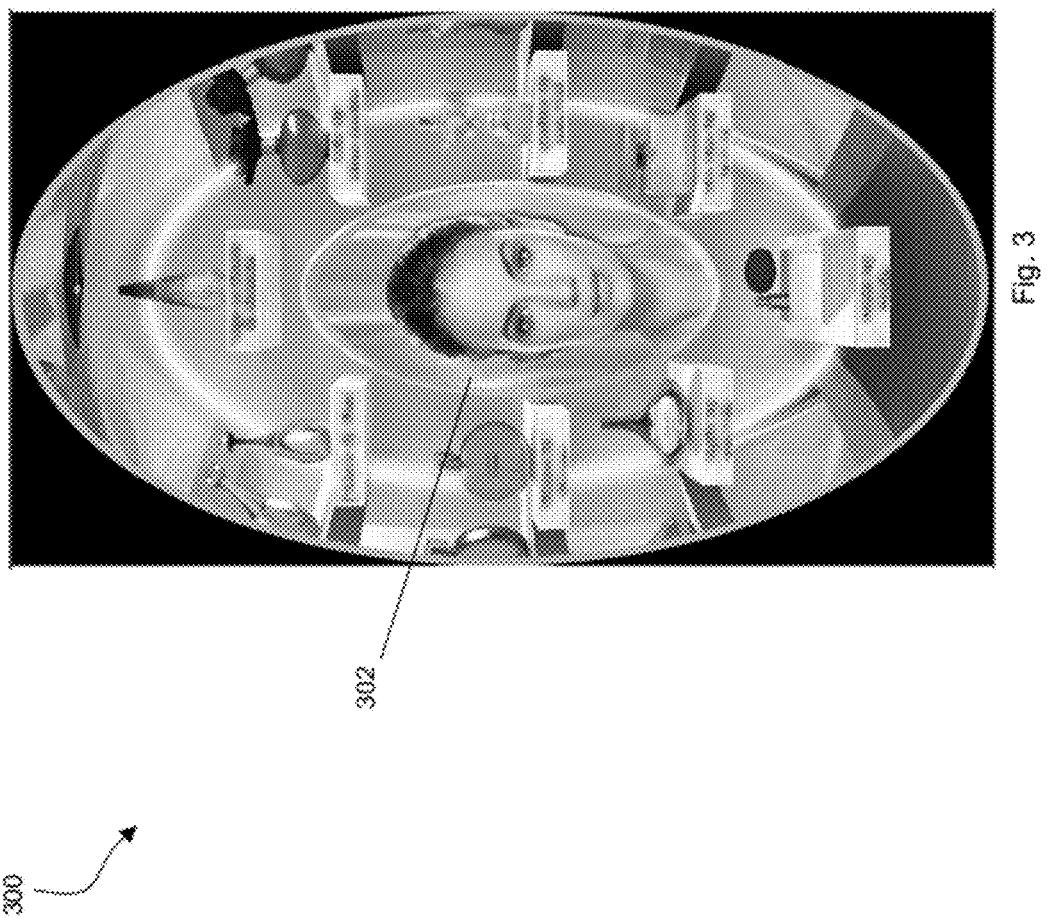
FIG. 3 illustrates an embodiment of a virtual shopping display that includes one or more products that are arranged at or around an image display.

FIG. 3 illustrates an embodiment of a virtual shopping display 300 that includes one or more products that are arranged at or around 2D/3D image display 302. A plurality of products may be arranged below and/or to the sides of 2D/3D image display 302. Alternatively or in addition, a plurality of products may be arranged in a circular fashion bordering around 2D/3D image display 302. In yet another embodiment, there may be one product or a single line of products being offered for sale at or near 2D/3D image display 302. In addition to physical products (such as vials of perfume or cologne) that are provided at or near 2D/3D image display 302, virtual representations (such as 2D/3D images) of one or more products maybe provided in lieu of (or in addition to) products being offered sale. In such embodiment(s), software that is suitable for providing 2D/3D rendering is employed and used for providing one or more of the 2D/3D images. Moreover, virtual shopping display 300 may comprise a plurality of 2D/3D image displays 302.

In an embodiment wherein at least one product is physically located at or near 2D/3D image display 302, at least one camera may be provided for optically detecting the product(s) as well as activity associated therewith. In an embodiment, a plurality of cameras are positioned to at or near one or more respective shelves of virtual shopping display 300, for example, for product detection and recognition. Products provided with virtual shopping display 300 may be provided with machine recognizable identification, such as a tag or label, and be detected by at least one of a plurality of cameras that are detected when a product is turned, slid or otherwise moved from a respective position. In an embodiment, active or inactive RFID tags are effective for enabling virtual shopping display 300 to identify with particularity a single product that has been moved and to take action respective to that product. For example, when a product configured with an active or inactive RFID tag is moved, the tag effectively "wakes" and transmits to virtual product display 300 information representing the product and the movement thereof. Additional processing, such as to display information about the respective product, or to inquire whether a customer would like assistance with the respective product, may be provided in response to the transmission. This conveniently reduces or eliminates a need for other processing steps associated with product identification, such as by detecting a machine readable tag or image recognition to determine that a respective product has been moved and the identification thereof. A plurality of cameras increases a likelihood of detecting when an object, such as a product, has been touched or moved. In an embodiment, two cameras are positioned at the beneath a respective shelf of virtual shopping display 300 and are directed toward each other at a given angle, such as 45 degrees, or any other suitable angle. By positioning the cameras substantially at this angle, a virtual depth perception may be provided, for example, as each of the cameras detects an object, such as a customer's hand, moving toward or from a product. In one or more embodiments, object recognition may be provided by laser technology, video technology, recognizing an object's shape, tag, and/or active/inactive RFID.

Moreover, at least one computing device is in communication with the display screen and the at least one camera for presenting sales and promotional information on the display screen based at least on the contents and/or activity sensed thereby, substantially as shown and described in co-pending and co-owned PCT Patent Application PCT/CA2011/000412, as noted herein. As a person moves his/her hand to approach a product on or near virtual shopping display 300, or as a product is moved from a known location therewith, one or more actions may occur or be taken, For example, 2D/3D image display 302 may present become active and interact with the customer, for example, to display information relating to a product or to inquire whether the customer would like some assistance.

FIGS. 4A-4E illustrate example embodiments of virtual shopping display 300 that is configured with mirror 402 in any shape (e.g., circular, oval, rectangular, or the like) and arranged above a cylindrical portion 404. The mirror may be colored or may be clear. In an embodiment, the cylindrical portion is made of glass or similar material and one or more products are arranged therewith. Below the cylindrical portion may be a supporting apparatus, which may include one or more rods 406 and a base 407.

In the embodiment illustrated in FIGS. 4A-4E, virtual shopping display 300 is configured with a large cylinder supporting structure that includes a circular base, and another a similar cylindrical structure may be positioned and above the circular base. The products to be advertised in tandem with 2D/3D image display 302 may be arranged, for example, either on the circular base structure or within or on top of the actual cylindrical structure. Projections of the products may also be placed near cylindrical portion 404.

Figure 4B:
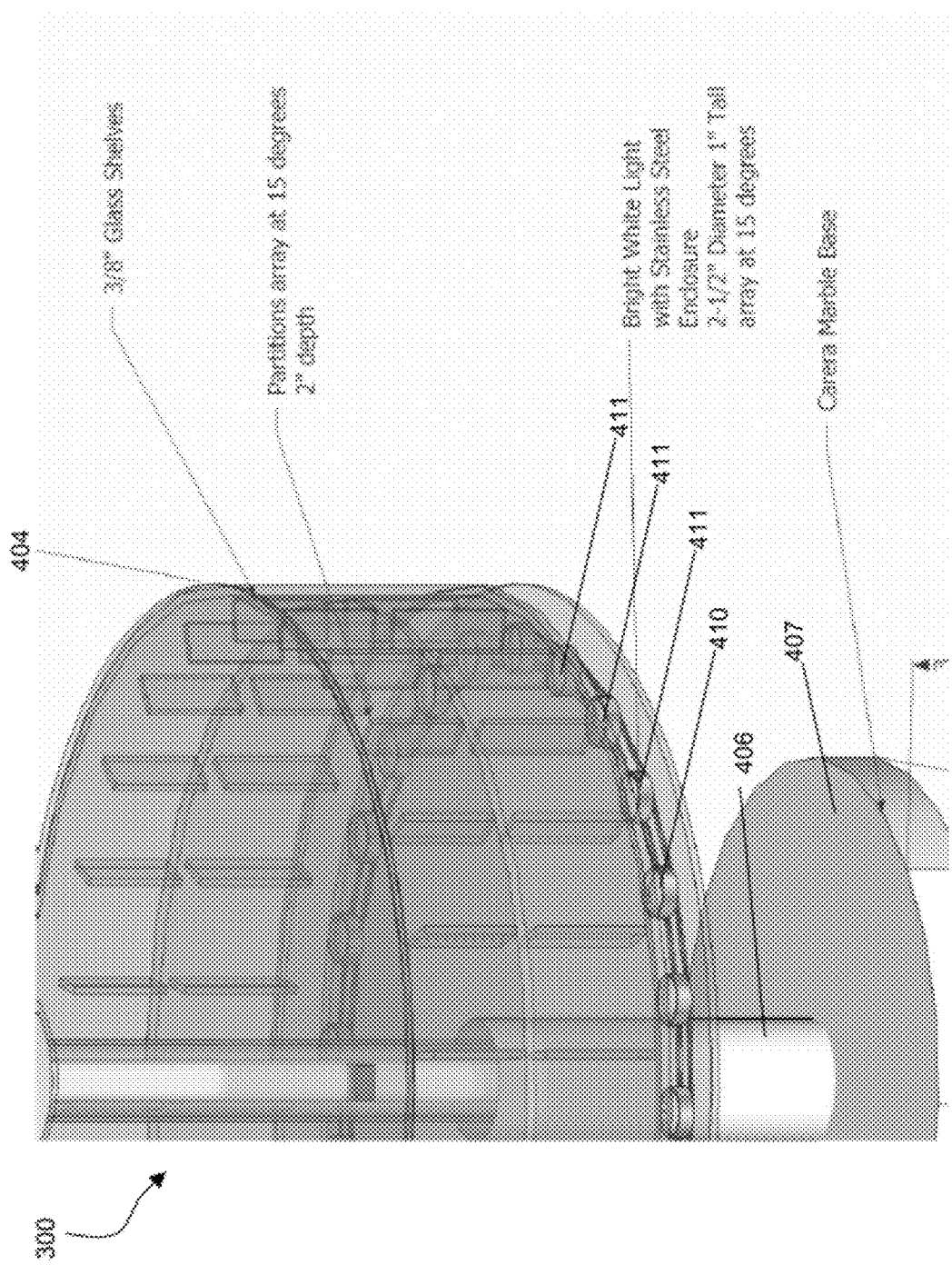

Continuing with reference to the example embodiment shown in FIGS. 4A-4E, virtual shopping display 300 comprises a clear glass border and/or a stainless steel cover 408. 2D/3D display 302 may be arranged at or near the top of a pole or other cylindrical supporting structure such as a thin glass tube with frosted glass inside the tube (see, for example, FIG. 4A). Around the thin cylindrical supporting structure may be wide cylindrical structure 404. Wide cylindrical structure 404 may, for example, contain small glass shelves or small partitions, arranged in an array, for example, of 15 degrees at a depth of 2 inches, and may be useable for displaying products.

Although the example illustrated in FIGS. 4A-4E and references herein relate to "thin" cylindrical or "wide" cylindrical structures, other relative sizes or shapes are supported by the present application. For example, one or more pyramidal structures or square-shaped structure(s), or combinations thereof, may be provided with virtual shopping display 300.

Continuing with reference to FIGS. 4A-4E, lights 410 may further be arranged at the bottom of the wide cylindrical structure. In addition or in the alternative to lights 410, one or more cameras 41 may be arranged at or near the bottom of wide cylindrical structure 404 for, for example, monitoring one or more products provided therewith or for detecting movement, such as of a customer approaching a shelf or product provided with virtual shopping display 300.

In accordance with one or more embodiments of the present application, a customer transaction is supported via virtual shopping display 300 in efficient, convenient and highly accurate ways. For example, a customer query may be received via input device(s) provided with virtual display 300. Thereafter, the query may be transmitted to one or more parties operating computing devices for responding to the customer. In an embodiment, a plurality of operators provide replies to customer queries to cross-reference and/or ensure accuracy of replies to the queries.

In an embodiment, a database of prepared replies is provided and respective replies to queries are provided to one or more operators who submit at least portions of the query, such as keywords thereof. As the operator(s) enter keywords associated with a query, sample queries and/or responses may appear automatically and may be selectable for fast and accurate access. For example, an operator, in response to a customer asking for information about CHANEL #44 may type the letters C H A . . . , and sample queries, answers and/or keywords may appear for the operator to select a response. As the information representing a query (or question) that is submitted increases, such as by the operator(s) adding one or more words or letters at a time, the higher the likelihood is of obtaining an accurate match. Once selected, the appropriate reply is preferably transmitted to virtual shopping display 300 and presented to the customer, substantially as described herein.

Continuing with reference to FIGS. 4A-4E, at the bottom of wide cylindrical structure 404 may be a larger circular or oval base 407 made out of a strong material, such as marble (e.g., a carera marble base or a base made out of marble or other suitable material). The products being advertised in tandem with 2D/3D image display 302 may be placed within the shelves of the wider cylindrical structure 404 or may be placed above on top of the wider cylindrical structure or to the sides of the wider cylindrical structure. In an embodiment, lights 410 at the bottom of the wide cylindrical structure 404 may be arranged at an array of 15 degrees for each light to create an overall circular lighting for the entire wide cylindrical structure. In an embodiment, lights 410 may be bright white lights or LEDs each having stainless steel enclosures.

FIG. 4F illustrates an alternative example embodiment of virtual shopping display 300 that includes square base 407, and virtual representations of products, such as shown and described more fully in co-owned and co-pending U.S. patent application Ser. No. 13/073,894, entitled SYSTEMS AND METHODS FOR MAKING AND USING INTERACTIVE DISPLAY TABLE FOR FACILITATING REGISTRIES, filed Mar. 28, 2011 (the entire contents of which are incorporated by reference herein).

FIG. 5 illustrates an example virtual shopping display 300 that includes tower 502, which may be made of glass or a similar material. Tower 502 may further include a thin clear glass or glass-like border, and/or may include a background made of a clear mirror material or similar material. Further, glass tower 502 may be coupled to 2D/3D image display 302 and may be transparent and comprised of a plurality of interlocking frames or prisms to create a modern-looking aesthetically pleasing effect. In an embodiment, logos 504 of one or more products being sold (for instance, a logo of a famous perfume company) may be displayed prominently. In an embodiment, logos 504 may be backlit, and/or may be placed on a colored (e.g., golden) material having a reflective surface. Further, and in the embodiment illustrated in FIG. 5, the display rectangle or case may display one or more logo banners, for example on the side and/or front surfaces of the display rectangle boxes. In an embodiment, the display rectangle may have one or more cavities 506, for example, at the middle of the top and bottom surfaces to enable products to be placed within and to be advertised.

FIGS. 6A and 6B illustrate an alternative embodiment of virtual product display 300. In the embodiment shown in FIG. 6, mirror 402 attached to virtual shopping display 300 may include a plurality of more layers. One layer, for example, may include a 2D/3D image display 302 and contains mirror 402. Also shown in FIG. 6A, glass border 602 runs around the edges of mirror 402. Another layer 604, beneath the first surface layer, may be hollow or configured to be made of glass or other similar material. This second layer may, in addition or in the alternative, be configured with a stainless steel cover 408. A third layer (not shown) may be also provided at the back of the mirror structure, and may also be configured of glass or also be covered with stainless steel cover 408. A plurality of layers provides an aesthetically pleasing and effective display. Also illustrated in FIGS. 6A and 6B is glass shelf 606. A plurality of materials may be used in accordance with virtual shopping display 300, including, for example, glass, plastic, wood, concrete or other suitable material.

FIG. 7 illustrates at least a portion of an example embodiment of virtual shopping display 300. In the example shown in FIG. 7, cover portion 408 (illustrated as stainless steel cover 408) is provided adjacent to mirror portion 402. 2D/3D image display 302 is illustrated adjacent to mirror portion 402, and a glass border.

Figure 8B:
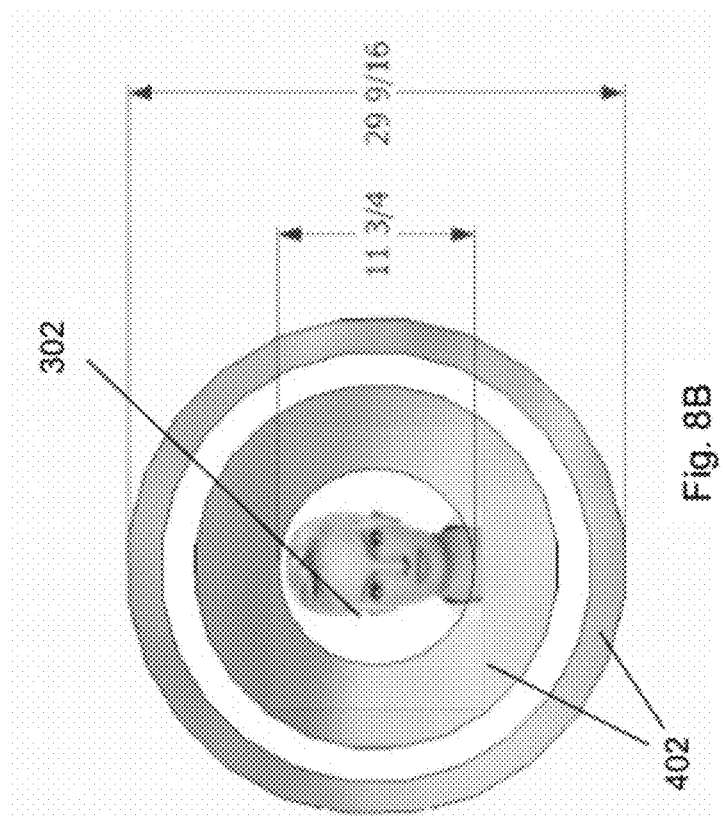
Figure 8A:
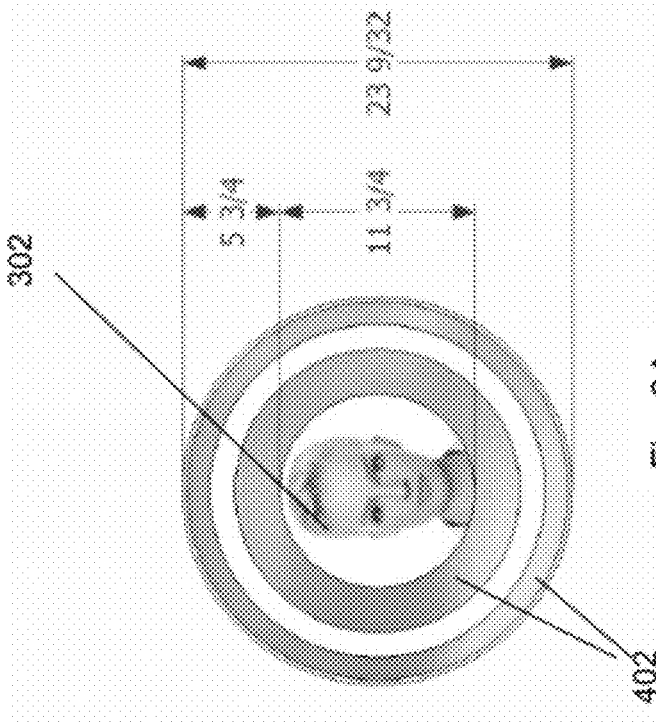

FIGS. 8A-8E illustrate example embodiments of the present application and illustrate one or more mirrors provided in one or more different sizes and lengths that may be configured as rings or borders around 2D/3D image display 302. In one or more embodiments, there may be a larger border around the central 2D/3D image display 302 (FIG. 8A). In another embodiment, there may be less of a border or a smaller space between the outside border and the central 2D/3D image display 302 (FIG. 8B). This may perhaps be a large more circular plate structure where the central 2D/3D image display 302 is arranged in the very middle of the structure. In an embodiment, there may be minimal space between the outside border and the central 2D/3D image display 302 and 2D/3D image display 302 may be arranged to take up substantially the entirety of the surface. Other layouts and example sizes and lengths are illustrated in FIGS. 8C-8E.

Figure 9A:
FIGS. 9A and 9B illustrate an example embodiment of virtual shopping display that includes one or more interactive textual displays.
Figure 9B:

FIGS. 9A and 9B illustrate an example embodiment of virtual shopping display 300 that includes one or more interactive textual displays that may be displayed below 2D/3D image display 302, such as on mirror portion 402. For example, one or more questions may be provided to ask a customer if (s)he is a natural blonde, brunette, redhead or if (s)he has black hair. In another example, questions may be provided to ask whether a viewer has eyes that are hazel or green or brown. In an embodiment, the interactive text displays would enable a customer or user to navigate to other selections on an internet website for ecommerce and financial transactions. For example, a user may purchase a product, deposit funds in an account, view other selections, order products, contact customer service or contact a sales representative.

As noted herein, virtual shopping display 300, in accordance with the present application, may also provide optional touch interaction and sensor feedback using video touch technology or other technologies such as, for example, infrared ultrasonic, active or inactive RFID. Virtual shopping display 300 is not limited to touch technologies or touch interaction and can also be entirely video or entirely hyper-realistically 2D/3D content and triggered instead with speech commands, not requiring the user to touch the display at all. Responses to prompts, such as illustrated in FIGS. 9A and 9B can be submitted accordingly.

In an embodiment, a customer is greeted by a virtual full-sized person, substantially as described and shown in co-owned and co-pending U.S. patent application Ser. No. 13/019,974, entitled SYSTEMS AND METHODS FOR HUMAN INTELLIGENCE PERSONAL ASSISTANCE and filed Feb. 2, 2011 (the entire contents of which are incorporated by reference herein). Referred, generally, as a human intelligence personal assistant ("HIPA"), customers may be greeted and provided with information and prompted for replies to queries in connection with any product or service provided for sale. For example, a customer may be asked if he or she is aware of current specials in the various departments at a store, or whether he or she would be interested in further details or assistance with additional information. For example, the HIPA may provide information relating to the location of a specific department, the cost of a particular product whereby the customer provides a verbal description of the item and the HIPA can confirm it by displaying an image of the product. The HIPA may also provide stock availability and details of items that were advertised. In an embodiment, the HIPA has the ability to sell the items directly to the customer using the best sales techniques know to retail that will be pre-scripted by an retail/publicity specialty agency.

In an embodiment, an operator of a computing device that may support a HIPA may have access to information displayed on 2D/3D image display 302. Moreover, the operator may engage in interactivity with a customer. Moreover, and as described in co-owned and co-pending U.S. patent application Ser. No. 13/019,974, a plurality of respective devices are supported, including, for example personal computers, tablets, smartphones, personal digital assistants or the like. The operators may be able, as well to take control of image display 302, and further provide audio content, via synchronous communication therewith.

In addition, a HIPA may provide assistance to a customer for selecting a gift for a friend. The HIPA is preferably well trained on virtually every aspect of a store, and has full access to inventory, product location, supplier product specifications and features of every item in inventory, video images (including 2D/3D renderings of retail items). Moreover, the HIPA is configured with a vast library of pre-scripted exceptional selling points and phrases regarding each item shown with a very targeted method of closing the sale. In this way, the HIPA sales experience is an exceptionally well received.

In other examples, the HIPA may ask a customer if he or she would like assistance to find the location of a specific product(s) or department(s). The HIPA may also ask the customer if he or she would like a copy of a map highlighting specific area(s) of interest and/or any specific advertisement or specific product details and/or a very clean simple 2D/3D map clearly indicating the location of departments or items of interest that are in relation to the customer's current location. The customer may be asked by the HIPA to provide his or her name and the customer may be asked to pick-up a personalized map highlighting the customer's area of interest and the map may also include featured products in those departments.

Figure 10A:
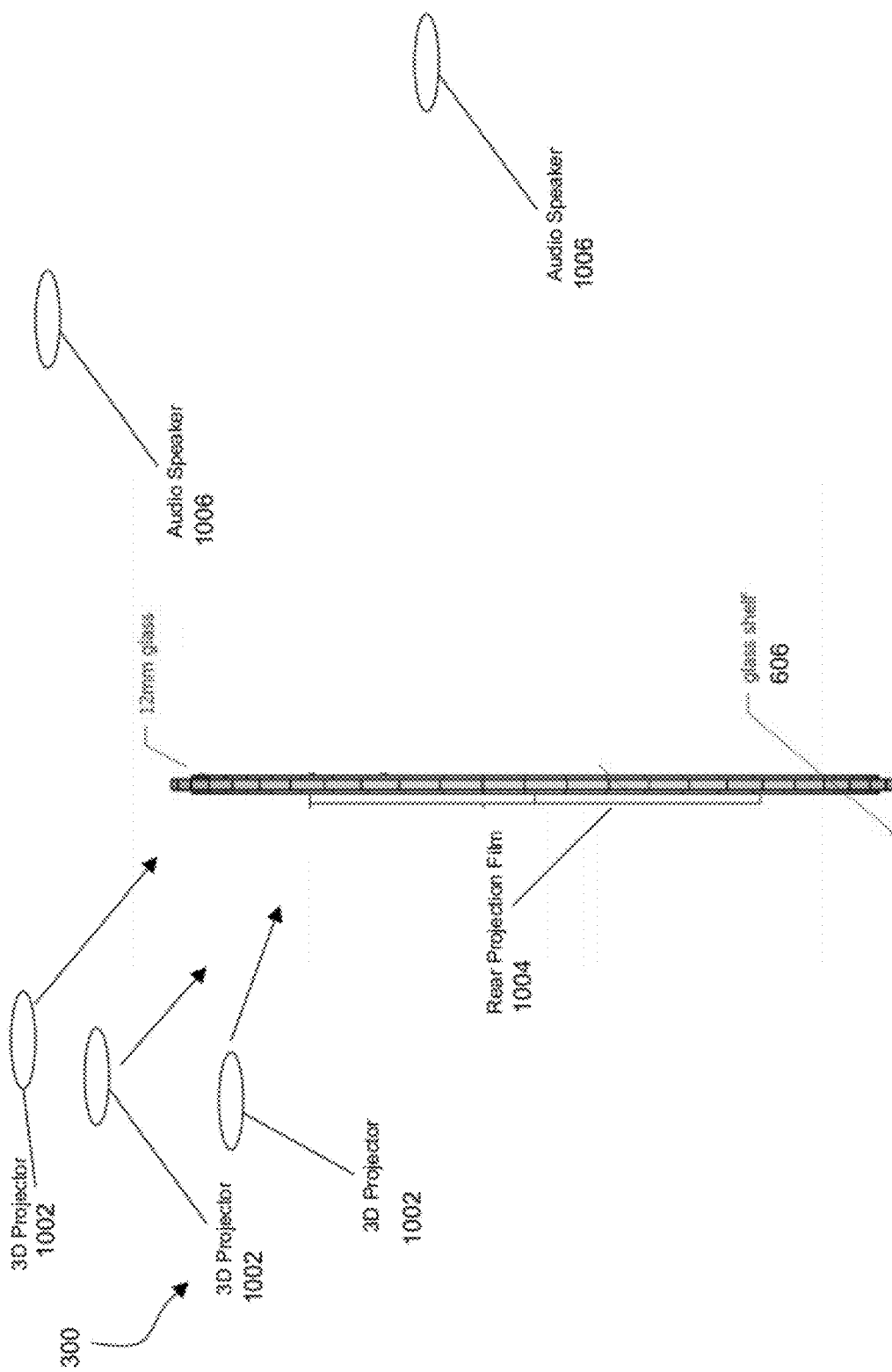
FIG. 10A illustrates an example arrangement for a virtual human intelligence personal assistant that is provided as a two or three-dimensional ("2D/3D") video of a salesperson.

FIG. 10A illustrates an example arrangement for a virtual HIPA that is provided as a highly defined, two or three-dimensional ("2D/3D") video of a salesperson may be recorded and displayed for shoppers. In an embodiment, a plurality of 2D/3D projectors 1002 are strategically positioned, for example in a ceiling and/or on stands, and for projecting onto the projection film, such as the VIKUITI rear projection film 1004, to provide high-resolution, 2D/3D image(s). Directional speakers 1006 may further be provided to play audio content, such as speech. The result is a life-like representation of a salesperson or other person.

In an embodiment, virtual shopping display 300 comprises a flexible, self-adhesive film 1004 that is applied thereto and that receives one or more projected images. The film provides crisp, very sharp images even in areas of high ambient light. Moreover, the film provides excellent display quality from virtually any viewing angle. An example of such film includes VIKUITI rear projection film, or other suitable product. VIKUITI film is believed by the inventor to be particularly effective for use in connection with reflective surfaces, such as mirrors, and provides a suitably wide viewing angle and very sharp color and images, substantially as shown in FIG. 10B.

Figure 11:
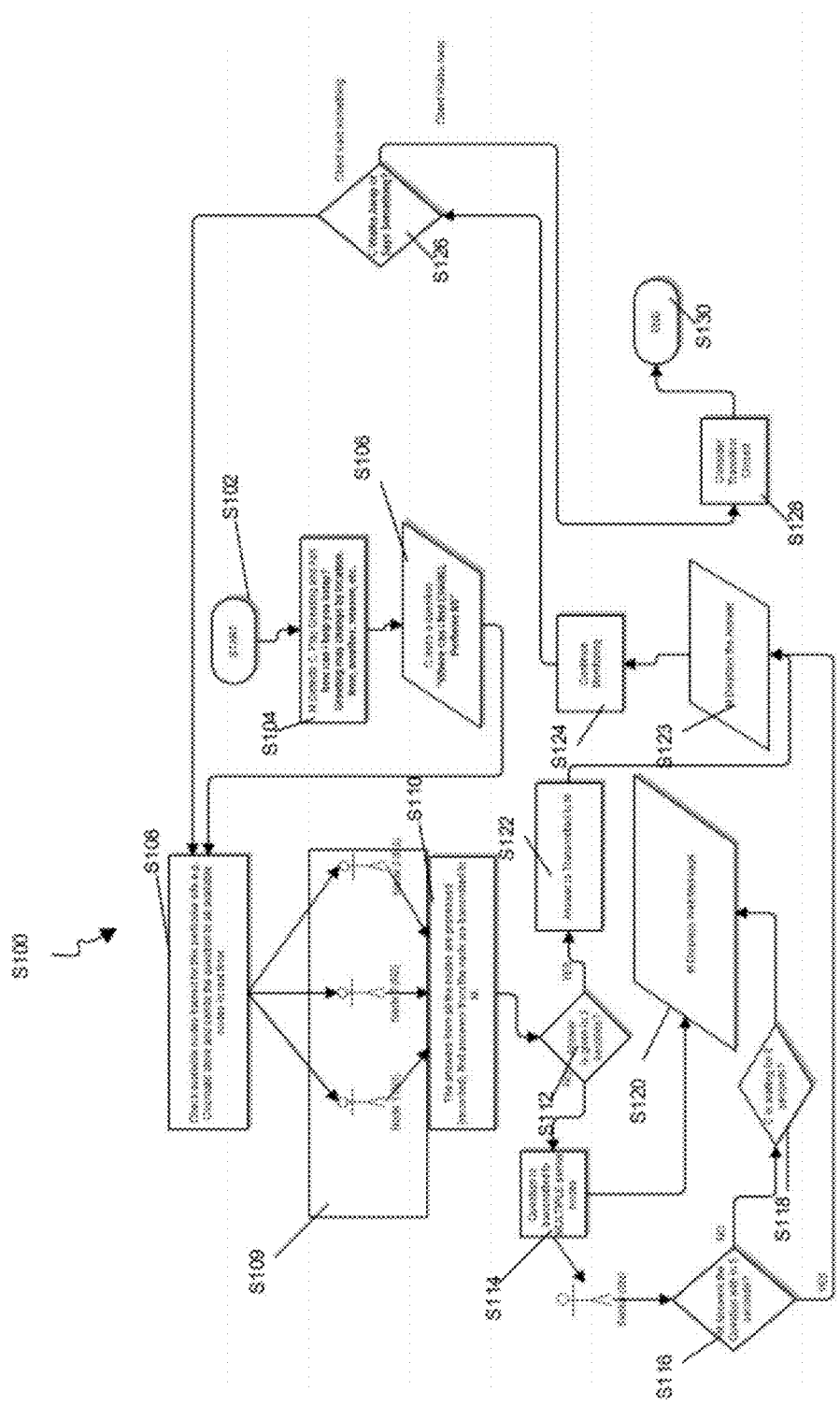
FIG. 11 is a flowchart illustrating example steps associated with a virtual shopping display in accordance with an embodiment.

FIG. 11 is a flowchart illustrating steps S100 associated with an example embodiment of virtual shopping display 300. As illustrated in FIG. 11, at step S102, a process starts and virtual shopping display 300 detects that a customer has approached or is otherwise in close proximity to virtual shopping display 300 (step S104). A customer may be detected via infrared signal technology, ultrasonic technology, image and/or video detection, or other suitable way. Upon detection, virtual shopping display 300 attempts to make contact with the customer, such as by inquiring whether the some assistance may be provided to the customer. At step S106, the customer responds to virtual shopping display 300 by posing a question, such as by asking where a product (e.g., "CHANEL") is located in the store. A substantial variety of queries are supported in accordance with the present application, including, for example, warranty information, product location information, product use information, interactions between a plurality of products or the like.

Continuing with reference to the flowchart shown in FIG. 11, after a query has been received by the customer, the process continues to step S108, and a plurality of "nodes" are identified that are trained or in the process of being trained for supporting the types of products provided with virtual shopping display 300. In this context, a "node" refers, generally, to a computing device user that is trained or in training for interfacing with virtual shopping display 300, such as for product support. As described in other detail in co-pending and co-owned U.S. patent application Ser. No. 13/019,974, nodes may be provided for various other kinds of support other than or in addition to product support. In the embodiment illustrated in FIG. 11, all such available nodes are sent the customer's query, and each works to provide an answer thereto (step S109).

In an embodiment and as described in other detail in co-pending and co-owned U.S. patent application Ser. No. 13/019,974, nodes may respond to customer queries by accessing a computing device and may input at least a portion thereof (e.g., one or more relevant keywords) to receive one or more prepared responses or answers that are retrieved from one or more databases. Alternatively, at least a portion of a customer query may be submitted without any or substantially without any human interaction and prepared replies may be provided to a node.

Continuing with reference to the flowchart shown in FIG. 11, answers from at least two of the respective nodes are received by virtual shopping display 300 (step S110). The replies may be compared and/or cross-referenced to determine the relative accuracy thereof in order to ensure the most effective and helpful response to a customer.

It is possible in some circumstances that a customer will present a query that is difficult to respond to, or may be impossible. Accordingly, and at step S112, an amount of time is calculated that represents how long a customer has been waiting for a response to his/her query. If the amount of time for the response to the query is longer than three seconds, then the process branches to step S114 and the query is transmitted to one or more other nodes, such as nodes that may be associated with one or more parties having senior authority and/or experience. Thereafter, a determination is made whether the response to the query has been answered within five seconds (step S116). If not, then another determination is made whether the query has been answered with eight seconds and, if not, then virtual shopping display 300 provides some response to the customer, such as a request to wait until a supervisor has been contacted (step S120). Alternatively, if at step S116, the reply to the query is received within five seconds then the process branches to step S123 and the reply is provided (such as via displaying the answer or speaking the answer via a HIPA). If, in the determination made at step S112 that a reply to the query is received within three seconds, then the process branches to step S122 and the reply is transmitted to virtual shopping display 300, and the process proceeds to step S123. At step S122, one or more additional comments may be provided, such as to thank the customer for the query or a remark that it has been a pleasure to respond.

Continuing with reference to the flowchart shown in FIG. 11, after the response is provided to the customer's query, the customer is continued to be monitored by virtual shopping display 300 (step S124). At step S126, a determination is made whether the customer has walked away or otherwise left the vicinity of virtual shopping display 300. If so, then the process branches to step S128 and the transaction (or transition) is assessed as "closed" and the process ends at step S130. Alternatively, if at step S126 a determination has been made that the customer has made some other comment or query, then the process branches back to step S108.

In addition to prepared replies that may be submitted to customers via virtual shopping display 300, the present application supports providing replies to customer queries that are "ad hoc" or have otherwise not been prepared in advance. Nodes may submit dynamically provided responses to complex queries to provide a very custom tailored presentation via virtual shopping display 300. After responses to queries are provided, additional queries may be received and responded to. Moreover, responses to queries from one or more nodes may be stored in a database and used for replies to future queries. Alternatively, quality control is supported, and one or more replies that appear to be inaccurate, for example, due to incorrect information received or referenced by a node, may be corrected and the database updated accordingly. In this way, the present application regards a dynamically improving support center provided to customers via virtual shopping display 300.

In addition to displaying a virtual person in a highly realistic, 2D/3D platform, an interactive touch screen may be provided for customers to engage and learn about one or more products. Users may make selections of one or more virtually displayed products to promote interactive demonstrations and/or applications regarding the products.

In an embodiment, the virtual salesperson may be recorded using a plurality of 2D/3D cameras. For example, two or more cameras may be positioned near each other, such as, for example, 3 inches, 7 inches, 20 inches, as long as they are turned toward each other at some angle, apart, and focused on the same general or specific area. Images that are received from the cameras and of may be processed to evaluate a common object at two different planes (one from each respective camera). Much as human eyes can perceive depth, images of an object from two cameras placed in close proximity can be used to determine the depth of an object. In one context, as an object (e.g., a product, human hand, or other thing) moves, its depth can be determined and virtual shopping display 300 can react accordingly.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages may be implemented in hardware, firmware, software or any combination thereof.

The disclosure includes methods and apparatuses which perform these methods, including data processing systems which perform these methods, and computer readable media containing instructions which when executed on data processing systems cause the systems to perform these methods.

While the methods and systems have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention both independently and as an overall system and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

Further, the use of the transitional phrase "comprising" is used to maintain the "open end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive forms so as to afford the applicant the broadest coverage legally permissible in accordance with the following claims. In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

Although the present application is described and shown in relation to particular embodiments thereof, many other variations and modifications and other uses will become apparent to those skilled in the art. Thus, various embodiments and variations are shown and described herein, and it is preferred, therefore, that the present application be limited not by the specific disclosure herein.

What is claimed is:

1. A display device for use in a sales facility or store, in order to automatically interact with shoppers, comprising:
    an upstanding image display that displays simultaneously at least one image of a product and a photorealistic image of a person in a generally vertical plane;
    a support structure coupled to the image display for placement of said display device;
    at least one database that stores a plurality of queries and replies to the queries; and
    at least one processor that is operatively coupled to the at least one database, and programmed and configured:
        to receive from the at least one database at least one reply to a first query by a shopper;
        to detect interaction with a physical specimen of the product by the shopper;
        to transmit at least one instruction to the image display for rendering a plurality of photorealistic images of the person providing at least one of the at least one reply to the first query to the shopper and information about the product resulting from detected interaction with the physical specimen of the product;
    wherein the upstanding image display is positioned to present standing shoppers with the plurality of photorealistic images at about eye level to simulate interaction with a human assistant.

2. The display device of claim 1, wherein the image display includes projection film that receives the at least one image of the product and the photorealistic image of the person from a plurality of projectors.

3. The display device of claim 1, further comprising a mirrored surface at least partially surrounding said upstanding image display.

4. The display device of claim 3, wherein the mirrored surface is translucent.

5. The display device of claim 3, wherein the image display is mounted behind the mirrored surface and provides the plurality of photorealistic images through said mirrored surface.

6. The display device of claim 1, further comprising at least one camera operatively coupled to the at least one processor,
    wherein interaction with the physical specimen of the product is detected by the at least one camera.

7. The display device of claim 6, wherein the at least one processor is further programmed and configured to determine, using an image from the at least one camera when the physical specimen of the product has been moved by the shopper, and to cause display of information associated with the at least one product in response to the determination that the physical specimen of the product has moved.

8. The display device of claim 1, wherein the at least one processor is further programmed and configured to provide the product as a virtual rendering.

9. The display device of claim 1, wherein the at least one processor is further programmed and configured to receive payment for the product.

10. The display device of claim 1, further comprising at least one content sensor in communication with the at least one processor and operable to detect a state of at least one shelf or table, wherein the at least one processor is further programmed and configured to display at least one image in response to a change in the state.

11. The display device of claim 1, wherein the image display displays at least one of a life-size human being and a head of a human being.

12. The display device of claim 1, further comprising providing audio content with the displayed images.

13. The display device of claim 1, wherein the plurality of photorealistic images appear three-dimensional.

14. The display device of claim 1, wherein the image display displays at least one image as a user approaches the display device.

15. The display device of claim 1, further comprising a shelf disposed below said image display and supported by said support structure.

16. A method of automatically interacting with shoppers, comprising:
    displaying simultaneously on at least one upstanding image display of a display device at least one image of a product and photorealistic image of a person in a generally vertical plane;
    providing a support structure coupled to the at least one upstanding image display for placement of said display device;
    providing at least one database that stores a plurality of queries and replies to the queries;
    detecting interaction with a physical specimen of the product by a shopper;
    receiving, by at least one processor from the at least one database, at least one reply to a first query by the shopper;
    transmitting, by the at least one processor, at least one instruction to the at least one image display;
    rendering a plurality of photorealistic images of at least the person providing at least one of the at least one reply to the first query to the shopper and information about the product resulting from detected interaction with the physical specimen of the product;
    wherein the at least one upstanding image display is positioned to present standing shoppers with the plurality of photorealistic images at about eye level to simulate interaction with a human assistant.

17. The method of claim 16, further comprising:
    providing at least one camera operatively coupled to the at least one processor;
    providing at least one product with the at least one image display,
    determining when at least one of the at least one product has moved wherein an image from the at least one camera represents the at least one product.

18. The method of claim 17, further comprising receiving payment for the at least one product.

19. The method of claim 17, further comprising displaying at least one image as a user approaches the at least one image display.

* * * * *

UNITED STATES PATENT AND TRADEMARK OFFICE
CERTIFICATE OF CORRECTION

| | |
|---|---|
| PATENT NO. | : 9,563,906 B2 |
| APPLICATION NO. | : 13/372428 |
| DATED | : February 7, 2017 |
| INVENTOR(S) | : Dean Stark |

It is certified that error appears in the above-identified patent and that said Letters Patent is hereby corrected as shown below:

In the Claims

Claim 7, Column 15, Line 55 "camera when" should read -- camera, when --

Claim 16, Column 16, Line 27 "and photorealistic" should read -- and a photorealistic --

Signed and Sealed this
First Day of August, 2017

Joseph Matal
*Performing the Functions and Duties of the*
*Under Secretary of Commerce for Intellectual Property and*
*Director of the United States Patent and Trademark Office*